(12) United States Patent
Kondo

(10) Patent No.: US 7,876,474 B2
(45) Date of Patent: Jan. 25, 2011

(54) IMAGE PROCESSING DEVICE CAPABLE OF SUPPRESSING OVER-CORRECTION IN RETINEX PROCESS

(75) Inventor: Masaki Kondo, Aichi-ken (JP)

(73) Assignee: Brother Kogyo Kabushiki Kaisha, Aichi-ken (JP)

( * ) Notice: Subject to any disclaimer, the term of this patent is extended or adjusted under 35 U.S.C. 154(b) by 630 days.

(21) Appl. No.: 11/931,697

(22) Filed: Oct. 31, 2007

(65) Prior Publication Data

US 2008/0100858 A1  May 1, 2008

(30) Foreign Application Priority Data

Oct. 31, 2006 (JP) ............................. 2006-296899
Nov. 20, 2006 (JP) ............................. 2006-313210

(51) Int. Cl.
*G06F 3/12* (2006.01)
(52) U.S. Cl. ........................................ 358/1.9; 358/519
(58) Field of Classification Search ................. 358/1.1, 358/1.9, 518, 519, 521; 382/162, 167, 274
See application file for complete search history.

(56) References Cited

U.S. PATENT DOCUMENTS

| 5,123,060 | A | * | 6/1992 | Cho et al. .................... 382/274 |
| 5,889,928 | A | * | 3/1999 | Nakamura et al. ........... 358/1.9 |
| 6,947,176 | B1 | | 9/2005 | Kubo et al. |
| 7,251,056 | B2 | | 7/2007 | Matsushima |
| 7,386,185 | B2 | | 6/2008 | Watanabe et al. |
| 7,580,168 | B2 | * | 8/2009 | Ikeno .......................... 358/519 |
| 2004/0091164 | A1 | | 5/2004 | Sakatani et al. |
| 2006/0158529 | A1 | | 7/2006 | Katagiri |

FOREIGN PATENT DOCUMENTS

| JP | A 2001-78025 | 3/2001 |
| JP | 2003-69822 | 3/2003 |
| JP | 2004-38842 | 2/2004 |
| JP | A 2004-164121 | 6/2004 |
| JP | A 2004-165840 | 6/2004 |
| JP | 3731577 | 10/2005 |
| JP | A 2006-211650 | 8/2006 |

* cited by examiner

*Primary Examiner*—Thomas D Lee
(74) *Attorney, Agent, or Firm*—Scully, Scott, Murphy & Presser, P.C.

(57) ABSTRACT

A first lower-range generating portion generates a pixel value of an output image based on a first nonlinear function in a first lower range where a pixel value of a subject pixel is lower than a predetermine value. The first upper-range generating portion generates the pixel value of the output image based on a first monotonically increasing function in a first upper range where the pixel value of the subject pixel is greater than or equal to the predetermine value. The pixel value of the output image increases toward a first maximum output luminance value as the pixel value of the subject pixel increases. The first maximum output luminance value is greater than a luminance value obtained by correcting a maximum pixel value of the original image based on the first nonlinear function. The first maximum output luminance value is proximate to the maximum pixel value of the original image.

25 Claims, 14 Drawing Sheets

| Y(x,y) | Outy | | | Y(x,y) | Outy | | |
|---|---|---|---|---|---|---|---|
| | refle=0.3 | refle=0.8 | refle=1.3 | | refle=0.3 | refle=0.8 | refle=1.3 |
| 0 | 4.25 | 5.89 | 6.92 | 132 | 112.56 | 153.39 | 179.18 |
| 4 | 12.41 | 17.21 | 20.24 | 136 | 116.74 | 156.50 | 181.67 |
| 8 | 18.37 | 25.47 | 29.94 | 140 | 120.91 | 159.60 | 184.15 |
| 12 | 23.47 | 32.55 | 38.26 | 144 | 125.09 | 162.70 | 186.64 |
| 16 | 28.07 | 38.92 | 45.78 | 148 | 129.27 | 165.80 | 189.12 |
| 20 | 32.31 | 44.81 | 52.68 | 152 | 133.45 | 168.90 | 191.61 |
| 24 | 36.30 | 50.33 | 59.17 | 156 | 137.63 | 172.01 | 194.10 |
| 28 | 40.07 | 55.57 | 65.33 | 160 | 141.81 | 175.11 | 196.58 |
| 32 | 43.67 | 60.56 | 71.20 | 164 | 145.99 | 178.21 | 199.07 |
| 36 | 47.14 | 65.36 | 76.85 | 168 | 150.16 | 181.31 | 201.55 |
| 40 | 50.48 | 69.99 | 82.29 | 172 | 154.34 | 184.41 | 204.04 |
| 44 | 53.71 | 74.48 | 87.56 | 176 | 158.52 | 187.51 | 206.52 |
| 48 | 56.84 | 78.83 | 92.67 | 180 | 162.70 | 190.62 | 209.01 |
| 52 | 59.90 | 83.06 | 97.65 | 184 | 166.88 | 193.72 | 211.50 |
| 56 | 62.87 | 87.19 | 102.50 | 188 | 171.06 | 196.82 | 213.98 |
| 60 | 65.78 | 91.22 | 107.25 | 192 | 175.23 | 199.92 | 216.47 |
| 64 | 68.63 | 95.17 | 111.88 | 196 | 179.41 | 203.02 | 218.95 |
| 68 | 71.41 | 99.03 | 116.43 | 200 | 183.59 | 206.13 | 221.44 |
| 72 | 74.15 | 102.82 | 120.89 | 204 | 187.77 | 209.23 | 223.93 |
| 76 | 76.83 | 106.55 | 125.26 | 208 | 191.95 | 212.33 | 226.41 |
| 80 | 79.47 | 110.20 | 129.56 | 212 | 196.13 | 215.43 | 228.90 |
| 84 | 82.07 | 113.80 | 133.80 | 216 | 200.30 | 218.53 | 231.38 |
| 88 | 84.62 | 117.35 | 137.96 | 220 | 204.48 | 221.63 | 233.87 |
| 92 | 87.14 | 120.84 | 142.06 | 224 | 208.66 | 224.74 | 236.36 |
| 96 | 89.62 | 124.28 | 146.11 | 228 | 212.84 | 227.84 | 238.84 |
| 100 | 92.07 | 127.67 | 150.10 | 232 | 217.02 | 230.94 | 241.33 |
| 104 | 94.48 | 131.02 | 154.04 | 236 | 221.20 | 234.04 | 243.81 |
| 108 | 96.87 | 134.33 | 157.92 | 240 | 225.38 | 237.14 | 246.30 |
| 112 | 99.22 | 137.59 | 161.76 | 244 | 229.55 | 240.25 | 248.79 |
| 116 | 101.55 | 140.82 | 165.56 | 248 | 233.73 | 243.35 | 251.27 |
| 120 | 103.85 | 144.01 | 169.31 | 252 | 237.91 | 246.45 | 253.76 |
| 124 | 106.13 | 147.17 | 173.02 | 255 | 240.00 | 248.00 | 255.00 |
| 128 | 108.38 | 150.29 | 176.69 | | | | |

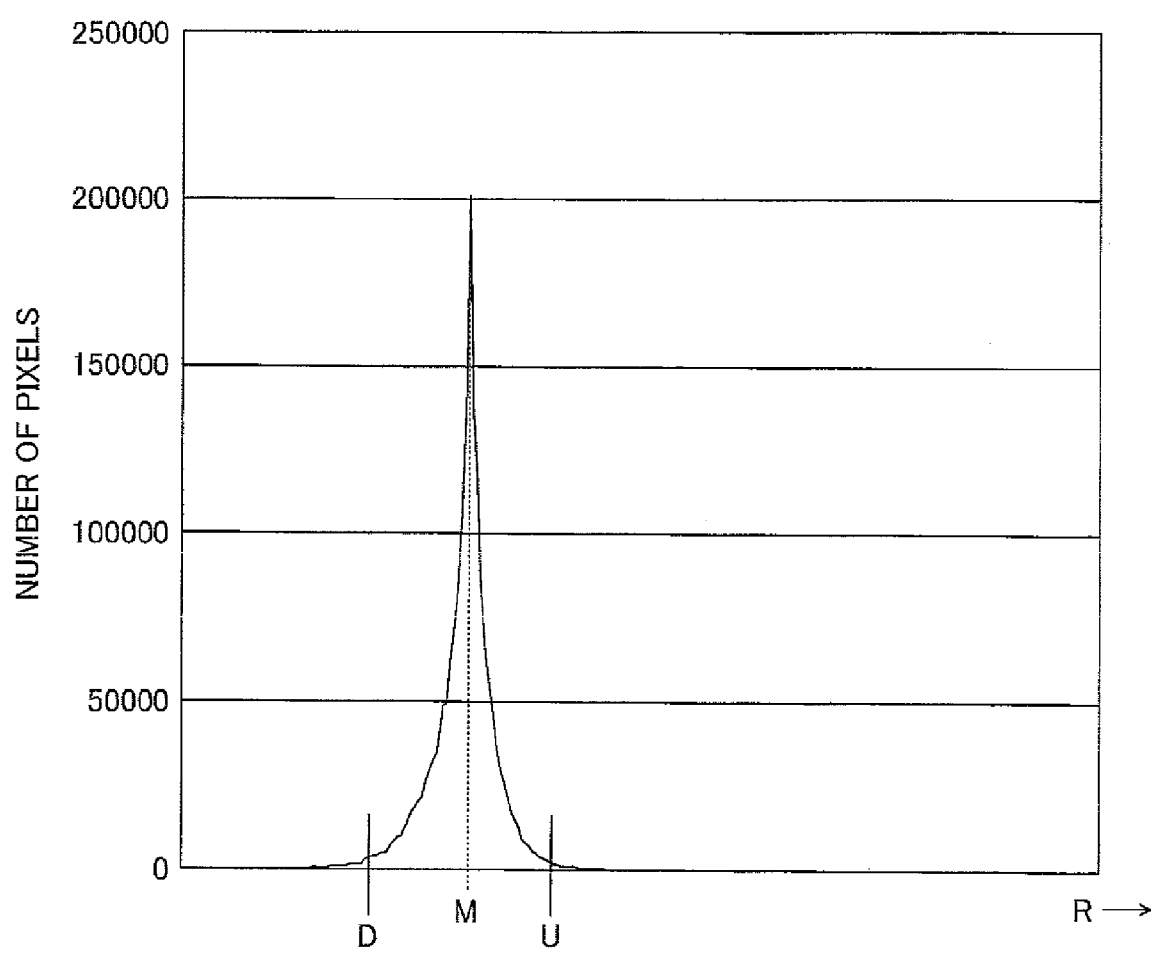

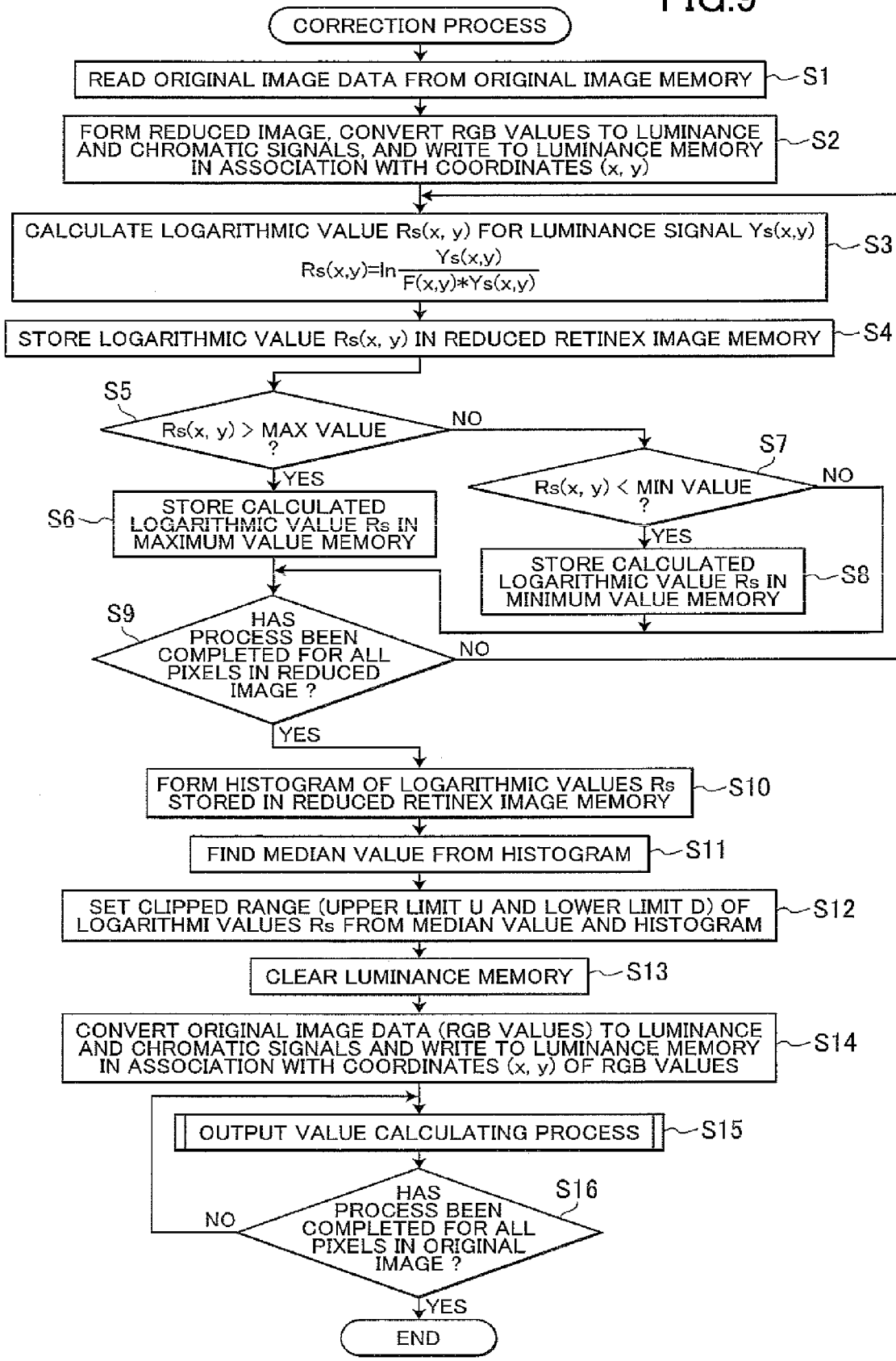

FIG.12A 12c,12d,12e

| Y | Duty refle=0.3 | Duty refle=0.8 | Duty refle=1.3 | Y | Duty refle=0.3 | Duty refle=0.8 | Duty refle=1.3 |
|---|---|---|---|---|---|---|---|
| 1 | 1.41 | 1.49 | 1.59 | 44 | 52.63 | 55.92 | 59.65 |
| 2 | 2.80 | 2.98 | 3.18 | 45 | 53.64 | 56.99 | 60.79 |
| 3 | 4.19 | 4.45 | 4.74 | 46 | 54.64 | 58.05 | 61.92 |
| 4 | 5.56 | 5.91 | 6.30 | 47 | 55.63 | 59.10 | 63.04 |
| 5 | 6.92 | 7.35 | 7.85 | 48 | 56.61 | 60.15 | 64.16 |
| 6 | 8.27 | 8.79 | 9.38 | 49 | 57.59 | 61.19 | 65.26 |
| 7 | 9.62 | 10.22 | 10.90 | 50 | 58.56 | 62.22 | 66.36 |
| 8 | 10.95 | 11.63 | 12.41 | 51 | 59.52 | 63.24 | 67.46 |
| 9 | 12.27 | 13.03 | 13.90 | 52 | 60.48 | 64.26 | 68.54 |
| 10 | 13.58 | 14.43 | 15.39 | 53 | 61.43 | 65.27 | 69.62 |
| 11 | 14.88 | 15.81 | 16.86 | 54 | 62.37 | 66.27 | 7.069 |
| 12 | 16.17 | 17.18 | 18.32 | 55 | 63.31 | 67.26 | 71.75 |
| 13 | 17.45 | 18.54 | 19.78 | 56 | 64.24 | 68.25 | 72.80 |
| 14 | 18.72 | 19.89 | 21.22 | 57 | 65.16 | 69.24 | 73.85 |
| 15 | 19.98 | 21.23 | 22.64 | 58 | 66.08 | 70.21 | 74.89 |
| 16 | 21.23 | 22.56 | 24.06 | 59 | 66.99 | 71.18 | 75.93 |
| 17 | 22.47 | 23.88 | 25.47 | 60 | 67.90 | 72.15 | 76.96 |
| 18 | 23.70 | 25.18 | 26.86 | 61 | 68.80 | 73.10 | 77.98 |
| 19 | 24.92 | 26.48 | 28.25 | 62 | 69.70 | 74.05 | 78.99 |
| 20 | 26.14 | 27.77 | 29.62 | 63 | 70.59 | 75.00 | 80.00 |
| 21 | 27.34 | 29.05 | 30.98 | 64 | 71.47 | 75.94 | 81.00 |
| 22 | 28.53 | 30.32 | 32.34 | 65 | 72.35 | 76.87 | 82.00 |
| 23 | 29.72 | 31.58 | 33.68 | 66 | 73.22 | 77.80 | 82.98 |
| 24 | 30.89 | 32.82 | 35.01 | 67 | 74.09 | 78.72 | 83.97 |
| 25 | 32.06 | 34.06 | 36.33 | 68 | 74.95 | 79.64 | 84.94 |
| 26 | 33.22 | 35.29 | 37.65 | 69 | 75.81 | 80.55 | 85.92 |
| 27 | 34.37 | 36.51 | 38.95 | 70 | 76.66 | 81.45 | 86.88 |
| 28 | 35.51 | 37.73 | 40.24 | 71 | 77.51 | 82.35 | 87.84 |
| 29 | 36.64 | 38.93 | 41.52 | 72 | 78.35 | 83.25 | 88.80 |
| 30 | 37.76 | 40.12 | 42.80 | 73 | 79.19 | 84.14 | 89.74 |
| 31 | 38.88 | 41.31 | 44.06 | 74 | 80.02 | 85.02 | 90.69 |
| 32 | 39.98 | 42.48 | 45.31 | 75 | 80.85 | 85.90 | 91.63 |
| 33 | 41.08 | 43.65 | 46.56 | 76 | 81.67 | 86.77 | 92.56 |
| 34 | 42.17 | 44.80 | 47.79 | 77 | 82.49 | 87.64 | 93.49 |
| 35 | 43.25 | 45.95 | 49.02 | 78 | 83.30 | 88.51 | 94.41 |
| 36 | 44.32 | 47.09 | 50.23 | 79 | 84.11 | 89.37 | 95.33 |
| 37 | 45.39 | 48.23 | 51.44 | 80 | 84.92 | 90.23 | 96.24 |
| 38 | 46.45 | 49.35 | 52.64 | 81 | 85.72 | 91.08 | 97.15 |
| 39 | 47.50 | 50.47 | 53.83 | 82 | 86.52 | 91.93 | 98.05 |
| 40 | 48.54 | 51.57 | 55.01 | 83 | 87.31 | 92.77 | 98.95 |
| 41 | 49.57 | 52.67 | 56.18 | 84 | 88.10 | 93.61 | 99.85 |
| 42 | 50.60 | 53.76 | 57.35 | 85 | 88.89 | 94.44 | 100.74 |
| 43 | 51.62 | 54.85 | 58.50 | | | | |

FIG.12B 12c, 12d, 12e

| Y | Outy | | | Y | Outy | | |
|---|---|---|---|---|---|---|---|
| | refle=0.3 | refle=0.8 | refle=1.3 | | refle=0.3 | refle=0.8 | refle=1.3 |
| 86 | 89.67 | 95.28 | 101.63 | 129 | 121.06 | 128.63 | 137.20 |
| 87 | 90.45 | 96.10 | 102.51 | 130 | 121.76 | 129.38 | 138.00 |
| 88 | 91.23 | 96.93 | 103.39 | 131 | 122.47 | 130.13 | 138.80 |
| 89 | 92.00 | 97.75 | 104.26 | 132 | 123.18 | 130.88 | 139.60 |
| 90 | 92.77 | 98.56 | 105.13 | 133 | 123.88 | 131.63 | 140.40 |
| 91 | 93.53 | 99.38 | 106.00 | 134 | 124.59 | 132.38 | 141.20 |
| 92 | 94.29 | 100.19 | 106.87 | 135 | 125.30 | 133.13 | 142.01 |
| 93 | 95.05 | 100.99 | 107.73 | 136 | 126.01 | 133.88 | 142.81 |
| 94 | 95.81 | 101.80 | 108.58 | 137 | 126.72 | 134.64 | 143.61 |
| 95 | 96.56 | 102.60 | 109.44 | 138 | 127.43 | 135.39 | 144.42 |
| 96 | 97.31 | 103.39 | 110.29 | 139 | 128.14 | 136.15 | 145.22 |
| 97 | 98.06 | 104.19 | 111.13 | 140 | 128.85 | 136.91 | 146.03 |
| 98 | 98.80 | 104.98 | 111.98 | 141 | 129.57 | 137.66 | 146.84 |
| 99 | 99.55 | 105.77 | 112.82 | 142 | 130.28 | 138.42 | 147.65 |
| 100 | 100.29 | 106.56 | 113.66 | 143 | 131.00 | 139.18 | 148.46 |
| 101 | 101.02 | 107.34 | 114.49 | 144 | 131.71 | 139.94 | 149.27 |
| 102 | 101.76 | 108.12 | 115.33 | 145 | 132.43 | 140.71 | 150.09 |
| 103 | 102.49 | 108.90 | 116.16 | 146 | 133.15 | 141.47 | 150.90 |
| 104 | 103.22 | 109.68 | 116.99 | 147 | 133.87 | 142.24 | 151.72 |
| 105 | 103.95 | 110.45 | 117.81 | 148 | 134.60 | 143.01 | 152.54 |
| 106 | 104.68 | 111.22 | 118.64 | 149 | 135.32 | 143.78 | 153.36 |
| 107 | 105.40 | 111.99 | 119.46 | 150 | 136.05 | 144.55 | 154.19 |
| 108 | 106.13 | 112.76 | 120.28 | 151 | 136.78 | 145.32 | 155.01 |
| 109 | 106.85 | 113.53 | 121.10 | 152 | 137.51 | 146.10 | 155.84 |
| 110 | 107.57 | 114.29 | 121.91 | 153 | 138.24 | 146.88 | 156.67 |
| 111 | 108.29 | 115.06 | 122.73 | 154 | 138.98 | 147.66 | 157.51 |
| 112 | 109.00 | 115.82 | 123.54 | 155 | 139.71 | 148.44 | 158.34 |
| 113 | 109.72 | 116.58 | 124.35 | 156 | 140.45 | 149.23 | 159.18 |
| 114 | 110.43 | 117.34 | 125.16 | 157 | 141.20 | 150.02 | 160.02 |
| 115 | 111.15 | 118.09 | 125.97 | 158 | 141.94 | 150.81 | 160.87 |
| 116 | 111.86 | 118.85 | 126.78 | 159 | 142.69 | 151.61 | 161.71 |
| 117 | 112.57 | 119.61 | 127.58 | 160 | 143.44 | 152.40 | 162.56 |
| 118 | 113.28 | 120.36 | 128.39 | 161 | 144.19 | 153.20 | 163.42 |
| 119 | 113.99 | 121.12 | 129.19 | 162 | 144.95 | 154.01 | 164.27 |
| 120 | 114.70 | 121.87 | 129.99 | 163 | 145.71 | 154.81 | 165.13 |
| 121 | 115.41 | 122.62 | 130.80 | 164 | 146.47 | 155.62 | 166.00 |
| 122 | 116.12 | 123.37 | 131.60 | 165 | 147.23 | 156.44 | 166.87 |
| 123 | 116.82 | 124.12 | 132.40 | 166 | 148.00 | 157.25 | 167.74 |
| 124 | 117.53 | 124.87 | 133.20 | 167 | 148.77 | 158.07 | 168.61 |
| 125 | 118.24 | 125.62 | 134.00 | 168 | 149.55 | 158.90 | 169.49 |
| 126 | 118.94 | 126.37 | 134.80 | 169 | 150.33 | 159.72 | 170.37 |
| 127 | 119.65 | 127.12 | 135.60 | 170 | 151.11 | 160.56 | 171.26 |
| 128 | 120.35 | 127.88 | 136.40 | | | | |

FIG.12C 12c,12d,12e

| Y | Outy | | | Y | Outy | | |
|---|---|---|---|---|---|---|---|
| | refle=0.3 | refle=0.8 | refle=1.3 | | refle=0.3 | refle=0.8 | refle=1.3 |
| 171 | 151.90 | 161.39 | 172.15 | 214 | 190.43 | 202.33 | 215.82 |
| 172 | 152.69 | 162.23 | 173.05 | 215 | 191.46 | 203.43 | 216.99 |
| 173 | 153.48 | 163.07 | 173.95 | 216 | 192.50 | 204.53 | 218.17 |
| 174 | 154.28 | 163.92 | 174.85 | 217 | 193.55 | 205.65 | 219.36 |
| 175 | 155.08 | 164.77 | 175.76 | 218 | 194.61 | 206.77 | 220.56 |
| 176 | 155.89 | 165.63 | 176.67 | 219 | 195.68 | 207.91 | 221.77 |
| 177 | 156.70 | 166.49 | 177.59 | 220 | 196.75 | 209.05 | 222.98 |
| 178 | 157.51 | 167.36 | 178.51 | 221 | 197.83 | 210.20 | 224.21 |
| 179 | 158.33 | 168.23 | 179.44 | 222 | 198.92 | 211.35 | 225.44 |
| 180 | 159.15 | 169.10 | 180.37 | 223 | 200.02 | 212.52 | 226.69 |
| 181 | 159.98 | 169.98 | 181.31 | 224 | 201.12 | 213.69 | 227.94 |
| 182 | 160.81 | 170.86 | 182.26 | 225 | 202.24 | 214.88 | 229.20 |
| 183 | 161.65 | 171.75 | 183.20 | 226 | 203.36 | 216.07 | 230.48 |
| 184 | 162.49 | 172.65 | 184.16 | 227 | 204.49 | 217.27 | 231.76 |
| 185 | 163.34 | 173.55 | 185.12 | 228 | 205.63 | 218.49 | 233.05 |
| 186 | 164.19 | 174.45 | 186.08 | 229 | 206.78 | 219.71 | 234.35 |
| 187 | 165.05 | 175.36 | 187.06 | 230 | 207.94 | 220.94 | 235.67 |
| 188 | 165.91 | 176.28 | 188.03 | 231 | 209.11 | 222.18 | 236.99 |
| 189 | 166.78 | 177.20 | 189.02 | 232 | 210.28 | 223.42 | 238.32 |
| 190 | 167.65 | 178.13 | 190.00 | 233 | 211.47 | 224.68 | 239.66 |
| 191 | 168.53 | 179.06 | 191.00 | 234 | 212.66 | 225.95 | 241.02 |
| 192 | 169.41 | 180.00 | 192.00 | 235 | 213.86 | 227.23 | 242.38 |
| 193 | 170.30 | 180.95 | 193.01 | 236 | 215.08 | 228.52 | 243.75 |
| 194 | 171.20 | 181.90 | 194.02 | 237 | 216.30 | 229.82 | 245.14 |
| 195 | 172.10 | 182.85 | 195.04 | 238 | 217.53 | 231.12 | 246.53 |
| 196 | 173.01 | 183.82 | 196.07 | 239 | 218.77 | 232.44 | 247.94 |
| 197 | 173.92 | 184.79 | 197.11 | 240 | 220.02 | 233.77 | 249.36 |
| 198 | 174.84 | 185.76 | 198.15 | 241 | 221.28 | 235.11 | 250.78 |
| 199 | 175.76 | 186.75 | 199.20 | 242 | 222.55 | 236.46 | 252.22 |
| 200 | 176.69 | 187.74 | 200.25 | 243 | 223.83 | 237.82 | 253.68 |
| 201 | 177.63 | 188.73 | 201.31 | 244 | 225.12 | 239.19 | 255.14 |
| 202 | 178.57 | 189.73 | 202.38 | 245 | 226.42 | 240.57 | 256.61 |
| 203 | 179.52 | 190.74 | 203.46 | 246 | 227.73 | 241.97 | 258.10 |
| 204 | 180.48 | 191.76 | 204.54 | 247 | 229.05 | 243.37 | 259.59 |
| 205 | 181.44 | 192.78 | 205.64 | 248 | 230.38 | 244.78 | 261.10 |
| 206 | 182.41 | 193.81 | 206.74 | 249 | 231.73 | 246.21 | 262.62 |
| 207 | 183.39 | 194.85 | 207.84 | 250 | 233.08 | 247.65 | 264.15 |
| 208 | 184.37 | 195.90 | 208.96 | 251 | 234.44 | 249.09 | 265.70 |
| 209 | 185.36 | 196.95 | 210.08 | 252 | 235.81 | 250.55 | 267.26 |
| 210 | 186.36 | 198.01 | 211.21 | 253 | 237.20 | 252.02 | 268.82 |
| 211 | 187.37 | 199.08 | 212.35 | 254 | 238.59 | 253.51 | 270.41 |
| 212 | 188.38 | 200.15 | 213.50 | 255 | 240.00 | 255.00 | 272.00 |
| 213 | 189.40 | 201.24 | 214.65 | | | | |

IMAGE PROCESSING DEVICE CAPABLE OF SUPPRESSING OVER-CORRECTION IN RETINEX PROCESS

CROSS REFERENCE TO RELATED APPLICATIONS

This application claims priority from Japanese Patent Application No. 2006-296899 filed Oct. 31, 2006 and No. 2006-313210 filed Nov. 20, 2006. The entire content of each of these priority applications is incorporated herein by reference.

TECHNICAL FIELD

The invention relates to an image processing device and a storage medium storing an image processing program, and more specifically to an image processing device and a storage medium storing an image processing program that performs a Retinex process on an image.

BACKGROUND

When taking a photograph of a subject under backlit conditions, e.g. against the sun, the image of the subject portion is an indistinct backlit image with low lightness and contrast, making it difficult to make out details of the subject. Image processing is performed to improve the quality of these backlit images, as well as images suffering in quality due to overexposure, underexposure, blurring due to jiggling when capturing the image, noise, insufficient light, and the like, in order to improve lightness and contrast in the image. One method used in conventional image processing is a Retinex process.

As disclosed in U.S. Patent Application Publication No. 2004/0091164 (corresponding to Japanese Patent No. 3,731, 577), the Retinex process is performed to correct lightness and contrast, such as gamma correction of illumination components. The Retinex process can produce an output image with improved image quality for low-quality regions of the input image, such as backlit regions.

SUMMARY

However, since the conventional method described above includes gamma correction calculations, the problem of overcorrection may arise. The over-correction is to excessively accentuate contrast of an image and to increase differences in gradation of luminance values. Consequently, an excessively bright part in a dark region or an excessively dark part in a bright region is formed. When the over-correction occurs in a bright region, excessively dark pixels appear in the bright region. Since such excessively dark pixels in the bright region (abrupt gradation changes) are visually striking, an image quality deteriorates significantly.

In this way, in a conventional Retinex process, the over-correction is caused by accentuating image contrasts, and it is difficult to achieve both accentuating image contrast and suppressing over-correction.

Hence, there has been proposed a method for combining an original input image data and a processed image obtained by performing Retinex process on input image data in order to generate output image data. This method generates an output image in which over-correction has been compensated since each pixel value in the Retinex-processed image is combined with a corresponding pixel value (luminance value) in the original input image, compared with a processed image on which Retinex-process has been simply performed. However, when combining the processed image and the original input image, calculations are required for each pixel in the image. Hence, an amount of calculations becomes extremely large, reducing the processing speed significantly.

In view of the foregoing, it is an object of the invention to provide an image processing device capable of suppressing over-correction in a Retinex process, and a storage medium for storing an image processing program capable of suppressing over-correction in a Retinex process.

In order to attain the above and other objects, the invention provides an image processing device. The image processing device includes a reflectance-component calculating portion and a first pixel-value generating portion. The reflectance-component calculating portion calculates a reflectance component based both on a pixel value of a subject pixel in an original image and on an average luminance of peripheral (surround) pixels around the subject pixel. The reflectance component is indicative of brightness of the subject pixel relative to the peripheral pixels. The first pixel-value generating portion generates a pixel value of an output image when the reflectance component indicates that the subject pixel is darker than the peripheral pixels. The first pixel-value generating portion includes a first lower-range generating portion and a first upper-range generating portion. The first lower-range generating portion generates the pixel value of the output image based on a first nonlinear function in a first lower range where the pixel value of the subject pixel is lower than a first predetermine value. The first upper-range generating portion generates the pixel value of the output image based on a first monotonically increasing function in a first upper range where the pixel value of the subject pixel is greater than or equal to the first predetermine value. The pixel value of the output image increases toward a first maximum output luminance value as the pixel value of the subject pixel increases. The first maximum output luminance value is greater than a luminance value obtained by correcting a maximum pixel value of the original image based on the first nonlinear function. The first maximum output luminance value is proximate to the maximum pixel value of the original image.

It is preferable that both the pixel value of the original image and the pixel value of the output image have a range between 0 and 255, and the first maximum output luminance value equal to 240.

It is also preferable that the first predetermined value be greater than or equal to a value corresponding to an intersecting point between a curve for the first nonlinear function of a minimum reflectance component and a curve for a non-conversion function. The non-conversion function generates the pixel value of the output image that is identical with the pixel value of the subject pixel.

It is more preferable that the first predetermined value be a value where a difference between a pixel value derived from a nonlinear function of a maximum reflectance component and a pixel value derived from a nonlinear function of a minimum reflectance component is smaller than or equal to a predetermined difference.

It is more preferable that the first predetermined value be a value proximate to a midpoint of a range that the pixel value of the subject pixel takes.

It is also preferable that the image processing device further include a second pixel-value generating portion that generates the pixel value of the output image when the reflectance component indicates that the subject pixel has a same brightness as the peripheral pixels. The second pixel-value generating portion includes: a second lower-range generating portion that generates the pixel value of the output image based on a second nonlinear function in a second lower range where the pixel value of the subject pixel is lower than a second predetermine value; and a second upper-range generating portion that generates the pixel value of the output image based on a second monotonically increasing function in a second upper range where the pixel value of the subject pixel is greater than or equal to the second predetermine value. The pixel value of the output image increases toward a second maximum output luminance value as the pixel value of the subject pixel increases. The second maximum output luminance value is greater than a luminance value obtained by correcting a maximum pixel value of the original image based on the second nonlinear function. The second maximum output luminance value is proximate to the maximum pixel value of the original image.

It is more preferable that the second predetermined value be greater than or equal to a value corresponding to an intersecting point between a curve for the first nonlinear function of a minimum reflectance component and a curve for a non-conversion function. The non-conversion function generates the pixel value of the output image that is identical with the pixel value of the subject pixel.

It is more preferable that the second predetermined value be set in such a manner that a pixel value derived from the second nonlinear function or the second monotonically increasing function is greater than a pixel value derived from the first nonlinear function or the first monotonically increasing function for the same subject pixel.

It is also preferable that the image processing device further include a third pixel-value generating portion that generates the pixel value of the output image when the reflectance component indicates that the subject pixel is brighter than the peripheral pixels. The third pixel-value generating portion includes: a third lower-range generating portion that generates the pixel value of the output image based on a third nonlinear function in a third lower range where the pixel value of the subject pixel is lower than a third predetermine value; and a third upper-range generating portion that generates the pixel value of the output image based on a third monotonically increasing function in a third upper range where the pixel value of the subject pixel is greater than or equal to the third predetermine value. The pixel value of the output image increases toward a third maximum output luminance value as the pixel value of the subject pixel increases. The third maximum output luminance value is greater than a luminance value obtained by correcting a maximum pixel value of the original image based on the third nonlinear function. The third maximum output luminance value is proximate to the maximum pixel value of the original image.

It is more preferable that both the pixel value of the original image and the pixel value of the output image have a range between 0 and 255, and the third maximum output luminance value equal to 255.

It is more preferable that the third predetermined value be greater than or equal to a value corresponding to an intersecting point between a curve for the first nonlinear function of a minimum reflectance component and a curve for a non-conversion function. The non-conversion function generates the pixel value of the output image that is identical with the pixel value of the subject pixel.

It is more preferable that the image processing device further include a second pixel-value generating portion that generates the pixel value of the output image when the reflectance component indicates that the subject pixel has a same brightness as the peripheral pixels. The second pixel-value generating portion includes: a second lower-range generating portion that generates the pixel value of the output image based on a second nonlinear function in a second lower range where the pixel value of the subject pixel is lower than a second predetermine value; and a second upper-range generating portion that generates the pixel value of the output image based on a second monotonically increasing function in a second upper range where the pixel value of the subject pixel is greater than or equal to the second predetermine value. The pixel value of the output image increases toward a second maximum output luminance value as the pixel value of the subject pixel increases. The second maximum output luminance value is greater than a luminance value obtained by correcting a maximum pixel value of the original image based on the second nonlinear function. The second maximum output luminance value is proximate to the maximum pixel value of the original image. The third predetermined value is set in such a manner that a pixel value derived from the third nonlinear function or the third monotonically increasing function is greater than a pixel value derived from the first nonlinear function or the first monotonically increasing function for the same subject pixel, and that the pixel value derived from the third nonlinear function or the third monotonically increasing function is greater than a pixel value derived from the second nonlinear function or the second monotonically increasing function for the same subject pixel.

It is also preferable that the image processing device further include a storage portion that stores, in association with first pixel values, table values including either gamma-corrected values obtained by performing gamma correction on the first pixel values using at least one predetermined reflectance component or second pixel values calculated based on both the gamma-corrected values and the first pixel values. The first pixel-value generating portion includes: an extracting portion that extracts at least one of the table values corresponding to the pixel value of the subject pixel; and a determining portion that determines the pixel value of the output image based on the at least one of the table values extracted by the extracting portion.

It is also preferable that the first nonlinear function be a function that increases the pixel value of the subject pixel in the original image to generate the pixel value of the output image, and that the first monotonically increasing function be a linear function.

It is also preferable that a single function be used for implementing both the first nonlinear function and the first monotonically increasing function.

According to another aspect, the invention also provides a storage medium storing a set of program instructions executable on an image processing device. The set of program instructions includes: (a) calculating a reflectance component based both on a pixel value of a subject pixel in an original image and on an average luminance of peripheral pixels around the subject pixel, the reflectance component being indicative of brightness of the subject pixel relative to the peripheral pixels; and (b) generating a pixel value of an output image when the reflectance component indicates that the subject pixel is darker than the peripheral pixels. The instructions (b) include: (c) generating the pixel value of the output image based on a first nonlinear function in a first lower range where the pixel value of the subject pixel is lower than a first predetermine value; and (d) generating the pixel value of the output image based on a first monotonically increasing function in a first upper range where the pixel value of the subject pixel is greater than or equal to the first predetermine value, the pixel value of the output image increasing toward a first maximum output luminance value as the pixel value of the subject pixel increases, the first maximum output luminance value being greater than a luminance value obtained by correcting a maximum pixel value of the original image based on the first nonlinear function, the first maximum output luminance value being proximate to the maximum pixel value of the original image.

It is preferable that both the pixel value of the original image and the pixel value of the output image have a range between 0 and 255, and that the first maximum output luminance value equal to 240.

It is also preferable that the first predetermined value be greater than or equal to a value corresponding to an intersecting point between a curve for the first nonlinear function of a minimum reflectance component and a curve for a non-conversion function. The non-conversion function generates the pixel value of the output image that is identical with the pixel value of the subject pixel.

It is more preferable that the first predetermined value be a value where a difference between a pixel value derived from a nonlinear function of a maximum reflectance component and a pixel value derived from a nonlinear function of a minimum reflectance component is smaller than or equal to a predetermined difference.

It is more preferable that the first predetermined value be a value proximate to a midpoint of a range that the pixel value of the subject pixel takes.

It is also preferable that the set of program instructions further include: (e) generating the pixel value of the output image when the reflectance component indicates that the subject pixel has a same brightness as the peripheral pixels. The instructions (e) include: (f) generating the pixel value of the output image based on a second nonlinear function in a second lower range where the pixel value of the subject pixel is lower than a second predetermine value; and (g) generating the pixel value of the output image based on a second monotonically increasing function in a second upper range where the pixel value of the subject pixel is greater than or equal to the second predetermine value, the pixel value of the output image increasing toward a second maximum output luminance value as the pixel value of the subject pixel increases, the second maximum output luminance value being greater than a luminance value obtained by correcting a maximum pixel value of the original image based on the second nonlinear function, the second maximum output luminance value being proximate to the maximum pixel value of the original image.

It is more preferable that the second predetermined value be greater than or equal to a value corresponding to an intersecting point between a curve for the first nonlinear function of a minimum reflectance component and a curve for a non-conversion function, the non-conversion function generating the pixel value of the output image that is identical with the pixel value of the subject pixel.

It is more preferable that the second predetermined value be set in such a manner that a pixel value derived from the second nonlinear function or the second monotonically increasing function is greater than a pixel value derived from the first nonlinear function or the first monotonically increasing function for the same subject pixel.

It is also preferable that the set of program instructions further include: (h) generating the pixel value of the output image when the reflectance component indicates that the subject pixel is brighter than the peripheral pixels. The instructions (h) include: (i) generating the pixel value of the output image based on a third nonlinear function in a third lower range where the pixel value of the subject pixel is lower than a third predetermine value; and (j) generating the pixel value of the output image based on a third monotonically increasing function in a third upper range where the pixel value of the subject pixel is greater than or equal to the third predetermine value, the pixel value of the output image increasing toward a third maximum output luminance value as the pixel value of the subject pixel increases, the third maximum output luminance value being greater than a luminance value obtained by correcting a maximum pixel value of the original image based on the third nonlinear function, the third maximum output luminance value being proximate to the maximum pixel value of the original image.

It is more preferable that both the pixel value of the original image and the pixel value of the output image have a range between 0 and 255, and that the third maximum output luminance value equal to 255.

It is more preferable that the third predetermined value be greater than or equal to a value corresponding to an intersecting point between a curve for the first nonlinear function of a minimum reflectance component and a curve for a non-conversion function, the non-conversion function generating the pixel value of the output image that is identical with the pixel value of the subject pixel.

It is more preferable that the set of program instructions further include: (k) generating the pixel value of the output image when the reflectance component indicates that the subject pixel has a same brightness as the peripheral pixels. The instructions (k) include: (l) generating the pixel value of the output image based on a second nonlinear function in a second lower range where the pixel value of the subject pixel is lower than a second predetermine value; and (m) generating the pixel value of the output image based on a second monotonically increasing function in a second upper range where the pixel value of the subject pixel is greater than or equal to the second predetermine value, the pixel value of the output image increasing toward a second maximum output luminance value as the pixel value of the subject pixel increases, the second maximum output luminance value being greater than a luminance value obtained by correcting a maximum pixel value of the original image based on the second nonlinear function, the second maximum output luminance value being proximate to the maximum pixel value of the original image. The third predetermined value is set in such a manner that a pixel value derived from the third nonlinear function or the third monotonically increasing function is greater than a pixel value derived from the first nonlinear function or the first monotonically increasing function for the same subject pixel, and that the pixel value derived from the third nonlinear function or the third monotonically increasing function is greater than a pixel value derived from the second nonlinear function or the second monotonically increasing function for the same subject pixel.

It is also preferable that the instructions (b) further include: (n) extracting at least one of table values corresponding to the pixel value of the subject pixel, the table values being stored in association with first pixel values in a storage portion, the table values including either gamma-corrected values obtained by performing gamma correction on the first pixel values using at least one predetermined reflectance component or second pixel values calculated based on both the gamma-corrected values and the first pixel values; and (o) determining the pixel value of the output image based on the at least one of the table values extracted by the instructions (n).

It is also preferable that the first nonlinear function be a function that increases the pixel value of the subject pixel in the original image to generate the pixel value of the output image, and that the first monotonically increasing function be a linear function.

It is also preferable that a single function be used for implementing both the first nonlinear function and the first monotonically increasing function.

BRIEF DESCRIPTION OF THE DRAWINGS

Embodiments in accordance with the invention will be described in detail with reference to the following figures wherein:

FIG. 4 is an explanatory diagram showing an upper limit table, a median value table, and a lower limit table;

FIG. 8 is a histogram of logarithmic values for a typical image, such as the image shown in FIGS. 7A and 7B;

FIG. 9 is a flowchart illustrating steps in a correction process performed according to the image processing program in the printer;

FIG. 12A is an explanatory diagram showing an upper limit table, median value table, and lower limit table stored in a ROM of a printer according to a third embodiment, where luminance values are from 1 to 85;

FIG. 12B is an explanatory diagram showing the upper limit table, median value table, and lower limit table stored in the ROM of the printer according to the third embodiment, where the luminance values are from 86 to 170;

FIG. 12C is an explanatory diagram showing the upper limit table, median value table, and lower limit table stored in the ROM of the printer according to the third embodiment, where the luminance values are from 171 to 255.

DETAILED DESCRIPTION

Figure 1:
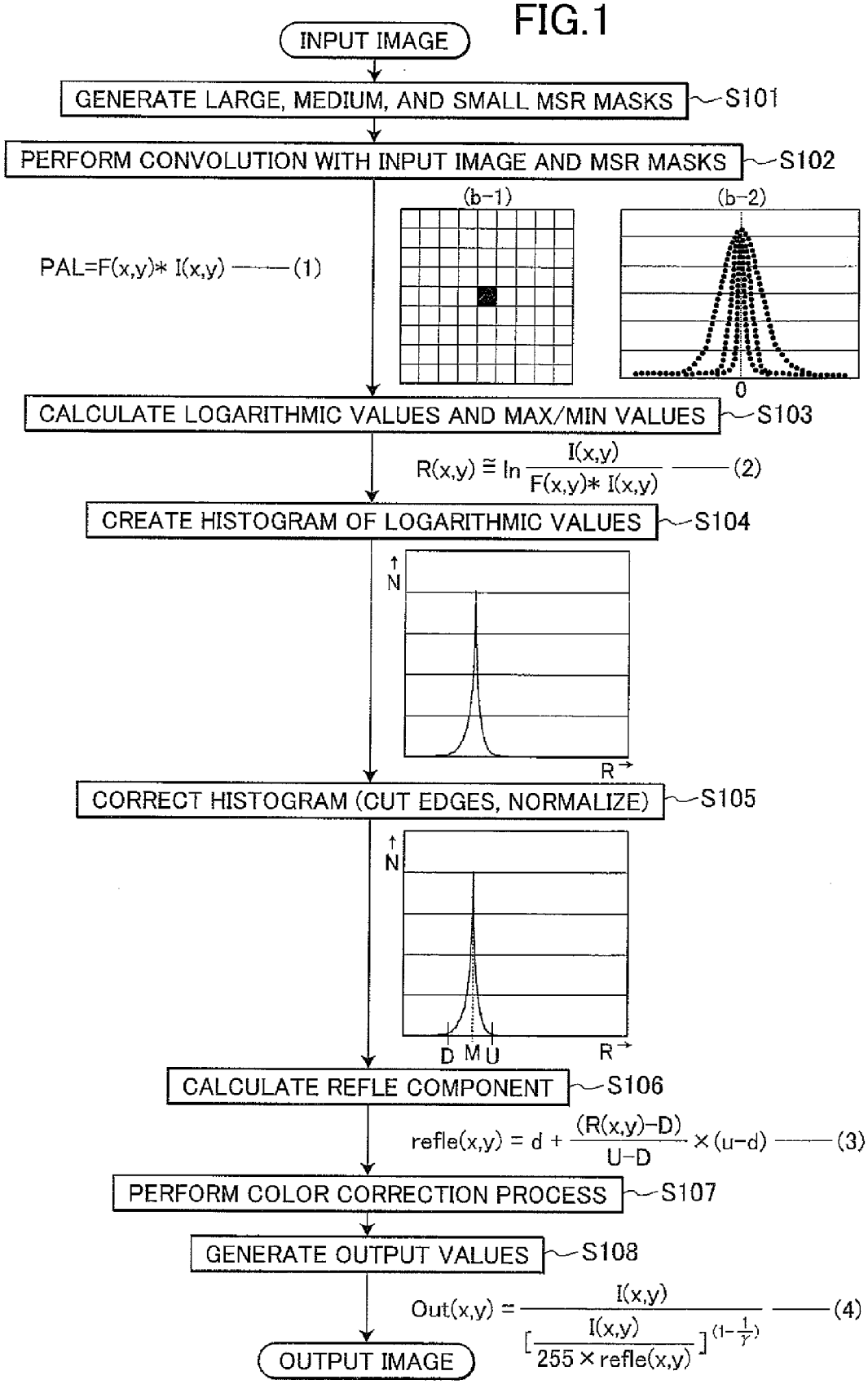
FIG. 1 is a flowchart illustrating the overall steps of a Retinex process.

First, a common Retinex process will be described briefly with reference to FIG. 1. In S101 and S102 of the Retinex process, a process using Gaussian filters (MSR masks) conforming to equation (1) is performed with each pixel in the input image (original image) set as the target pixel. The diagram (b-1) in FIG. 1 conceptually illustrates a Gaussian filter formed of an m×n matrix. The diagram (b-2) in FIG. 1 indicates filter coefficients set in each matrix constituting the Gaussian filters. In the graph (b-2) of FIG. 1, the horizontal axis denotes the position in the matrix (filter size), while the vertical axis denotes the filter coefficient. The value "0" indicated near the center of the horizontal axis is the center position of the filter. Positions farther away from "0" indicate matrix positions farther from the filter center. As shown in (b-2) in FIG. 1, the Gaussian filter is designed so that the filter coefficients grow gradually smaller in all four directions from the center, while the sum of filter coefficients is 1.

$$PAL = F(x,y) * I(x,y) \qquad \text{Equation (1)}$$

Here, PAL denotes the peripheral (surround) average luminance, x the horizontal coordinate, y the vertical coordinate, $I(x, y)$ the signal intensity at the coordinate $(x, y)$ (pixel value or value of the pixel signal), $F(x, y)$ the Gaussian filter, and "*" the convolution operation. The Gaussian filter process, which is a convolution operation performed with a Gaussian filter $F(x, y)$ in m×n regions for each pixel set as the target pixel, calculates the average luminance of pixel values averaged while adding weight to peripheral pixels based on the distance from the target pixel for each pixel. The average luminance of peripheral pixels calculated according to the Gaussian filter process reflects the values of peripheral pixels in the value of the target pixel.

In S103 each pixel value in the input image is divided by the corresponding average luminance calculated above according to equation (2), and the acquired value is converted to a logarithmic value.

$$R(x, y) \equiv \ln \frac{I(x, y)}{F(x, y) * I(x, y)} \qquad \text{Equation (2)}$$

R is the logarithmic value found from the above equation. A logarithmic value $R(x, y)$ is found for each pixel value. When finding these logarithmic values R, maximum and minimum values of the logarithmic values R are found in order to generate a histogram of the logarithmic values R.

In S104 a histogram (frequency distribution) of logarithmic values R is created within the range set by the maximum and minimum values, and the histogram is subsequently corrected in S105. To correct the histogram, a median value M is found from the histogram generated above, U is set to the upper limit of a range including a predetermined percentage (45%, for example) of pixels greater than the median value M, and D is set to the lower limit of a range including a predetermined percentage (45%, for example) of pixels less than the median value M.

In S106 a normalized reflectance value (normalized Retinex value) refle is found by normalizing the logarithmic values R. Specifically, the values of the upper limit U and lower limit D found above are set as a predetermined upper limit u and lower limit d, and the logarithmic values R within the range between the upper limit U and lower limit D are normalized to value within a range between the upper limit u and the lower limit d (i.e., the normalized reflectance values refle are calculated). This normalization is performed using equation (3), for example.

$$refle(x, y) = d + \frac{(R(x, y) - D)}{U - D} \times (u - d) \qquad \text{Equation (3)}$$

The normalized reflectance values refle found above are the reflected light components of the input image (the normalized reflected light components) and serve as parameters for finding the final reflected light components (output values Out). In S107 a color correction process, or CR process, is executed on the normalized reflectance values refle to generate output values Out. In S108 the output values Out are calculated according to equation (4) below. These output values Out are the values of pixels in the output image (output image data).

$$Out(x, y) = \frac{I(x, y)}{\left(\frac{I(x, y)}{255 \times refle(x, y)}\right)^{(1-1/\gamma)}} \qquad \text{Equation (4)}$$

Pixel values in the Retinex process are values combining the illumination component and the reflected light component, where the illumination component reflects luminance and the reflected light component reflects color. Since the illumination component is found by dividing the pixel value of the input image by the reflected light component, the denominator in equation (4) corresponds to the illumination component. The normalized reflectance values refle(x, y) is multiplied by 255 since pixel values in the input image are expressed as values between 0 and 255.

Figure 2:
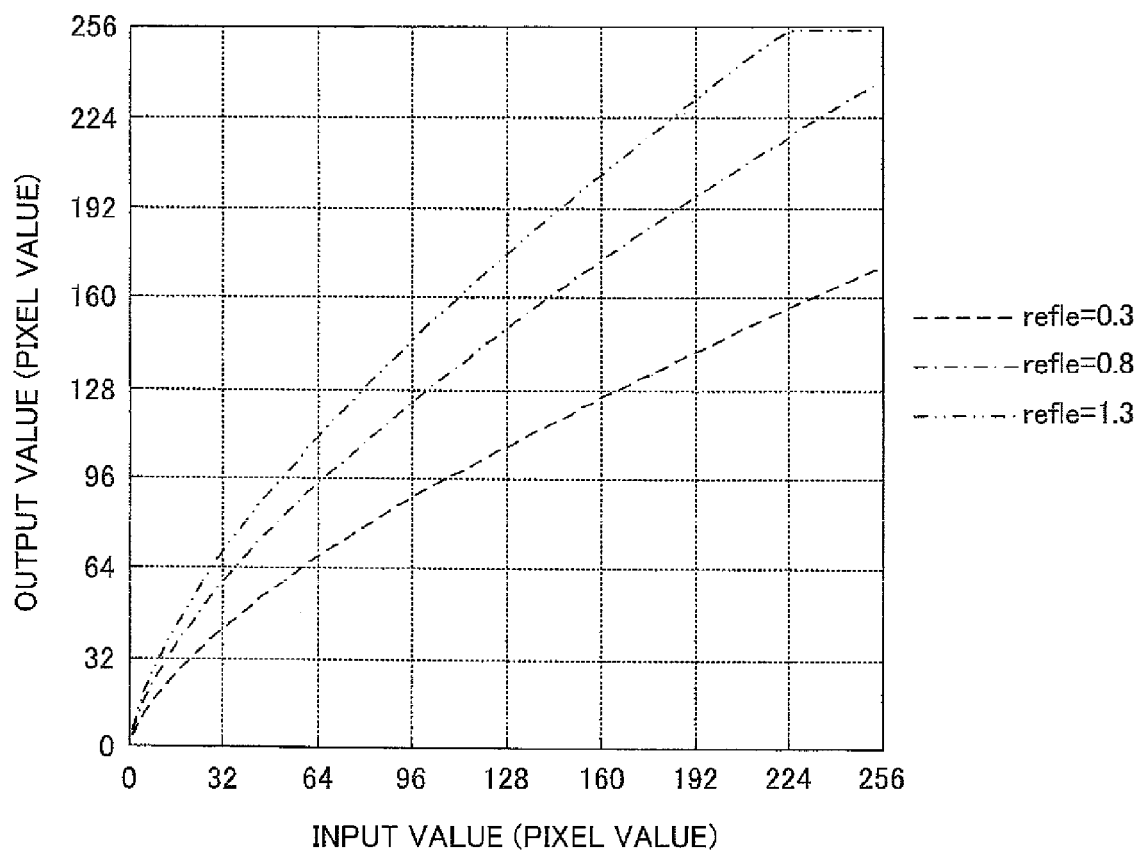
FIG. 2 is a graph showing the relationship between input pixel values in a Retinex process and output pixel values generated from the input pixel values.

Therefore, the output value Out is the reflected light component. Since pixel values in the output image data must be values for forming colors, output values Out including a color component are found. As is clear from equation (4), the calculated output value Out is a value incorporating an illumination component for which lighting and contrast have been corrected through gamma correction. FIG. 2 shows an example of a relationship between the pixel values 0-255 for input image data and the output values Out obtained by performing the process according to equation (4).

FIG. 2 is a graph showing the relationship between input image data and output image data generated from the input image data using equation (4), which incorporates a gamma correction operation. In the graph of FIG. 2, the horizontal axis represents pixel values in the input image data, while the vertical axis represents pixel values in the output image data. Since the graph curve (characteristic line) differs depending on the normalized reflectance value refle (logarithmic value R) used as a parameter in equation (4), FIG. 2 depicts characteristic lines for specific normalized reflectance values refle (0.3, 0.8, and 1.3) corresponding to cases in which the logarithmic value R is negative, zero, and positive, respectively. The graph in FIG. 2 depicts the characteristic line for a negative logarithmic value R (the normalized reflectance value refle of 0.3) with a dashed line, the characteristic line for a logarithmic value R of 0 (the normalized reflectance value refle of 0.8) with a single-dot chain line, and the characteristic line for a positive logarithmic value R (the normalized reflectance value refle of 1.3) with a double-dot chain line. Since the pixel value and luminance (brightness) are related, the luminance increases (becomes brighter) when the pixel value increases, and decreases (becomes darker) when the pixel value decreases.

Each characteristic line in the graph of FIG. 2 has a rate of change (slope) that exceeds 1 for smaller pixel values in the input image data. In other words, smaller inputted pixel values, i.e., pixels in dark regions, are increased (expanded) during correction and are outputted as output values Out. Hence, slight changes in input values are reflected greater in the output values Out, thereby accentuating the contrast by increasing change in intensity levels.

While the rate of change in each characteristic line decreases as the value of pixels in the input image data increases, the amount of decrease in this rate of change differs according to the normalized reflectance value refle (the logarithmic value R), as shown in FIG. 2. Larger pixel values, i.e., inputted pixel values in brighter regions, are decreased (compressed) more as the normalized reflectance value refle is decreased.

In other words, the smaller the normalized reflectance value in the Retinex process (that is, the closer the logarithmic value R is to the negative side than the positive side), the more the output value out is compressed as pixel values in the input image data increase. Further, the output value Out increases as the normalized reflectance value refle increases. Since the output value Out can take on a value within a wide range for the same input value according to the normalized reflectance value refle (the logarithmic value R), it is possible to inflate changes in intensity levels in the bright regions of the image.

Generally, when a target pixel that is darker than its peripheral pixels has a predetermined input value or greater, the output value Out generated in the Retinex process is a value smaller than the input value. Hence, the target pixel becomes a dark pixel having a lower luminance in the output image than in the input image. On the other hand, since the peripheral pixels around the target pixel are brighter than the target pixel, these pixels are corrected to be even brighter pixels according to the characteristic line for a positive logarithmic value R. As a result, the relative difference in brightness between the target pixel and its peripheral pixels in the output image, i.e., the difference in luminance (intensity) increases, providing more contrast. As can be seen in FIG. 2, the difference between the output value Out generated with a positive logarithmic value R and the output value Out generated with a negative logarithmic value R increases in brighter regions (for larger input values). Hence, the contrast is emphasized more for larger pixel values (larger luminance values, i.e., brighter regions) of the original image.

Figure 3:
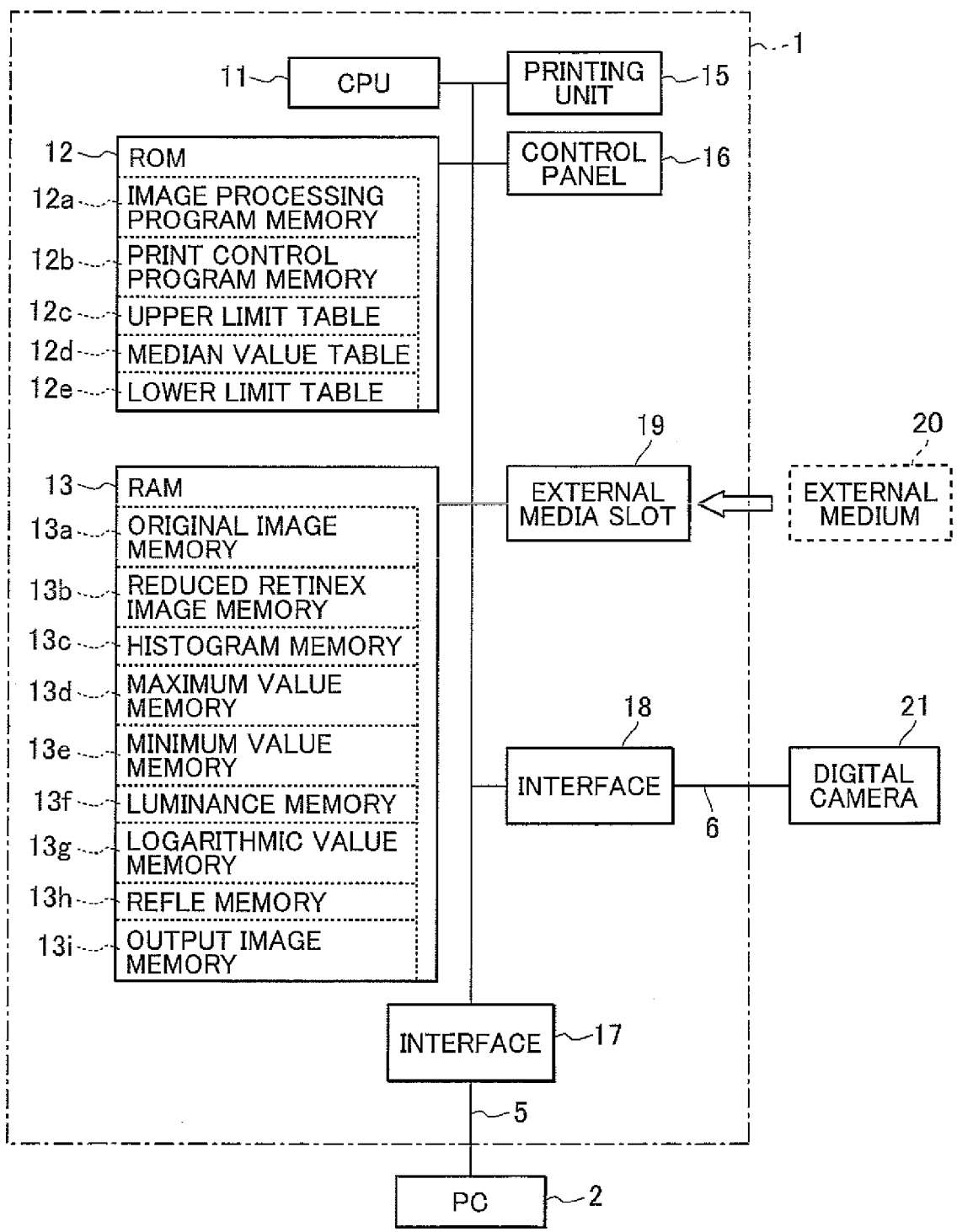
FIG. 3 is a block diagram showing the electrical structure of a printer provided with an image processing program according to a first embodiment of the invention.

An image processing device and a storage medium storing an image processing program according to a first embodiment of the invention will be described with reference to FIGS. 3 through 10. FIG. 3 is a block diagram showing the electrical structure of a printer 1 having a function for performing an image process according to the embodiment. The printer 1 is connected to a personal computer (hereinafter referred to as a "PC") 2, a digital camera 21, and/or an external medium 20. An image processing program installed on the printer 1 executes a Retinex process and a histogram process on image data (image data for an original document or the like) inputted from the PC 2, digital camera 21, or external medium 20. The image processing program corrects low-quality regions of the image data, such as backlit image regions.

As shown in FIG. 3, the printer 1 includes a CPU 11, a ROM 12, a RAM 13, a printing unit 15, and a control panel 16. The printing unit 15 has a print head and the like for printing out image data on a printing medium, such as paper. The control panel 16 has a user operating unit configured of a ten-key pad and the like, for example, enabling the user to input values for the size of the outputted image and the like.

The printer 1 also includes an interface 17, an interface 18, and an external media slot 19. The interface 17 is provided for connecting the printer 1 to the PC 2 with a cable 5. The interface 18 is provided fox connecting the printer 1 to the digital camera 21 with a cable 6. The external media slot 19 allows the user to detachably mount the external medium 20 in the printer 1, the external medium 20 being an SD card or a Memory Stick, for example. The interfaces 17 and 18 use the Universal Serial Bus (USB) communication method.

Accordingly, image data stored on the PC 2 can be inputted into the printer 1 via the cable 5 and the interface 17, while image data captured by the digital camera 21 can be inputted into the printer 1 via the cable 6 and the interface 18. Further, image data stored on the external medium 20 can be inputted into the printer 1 when the external medium 20 is mounted in the external media slot 19.

Figure 10:
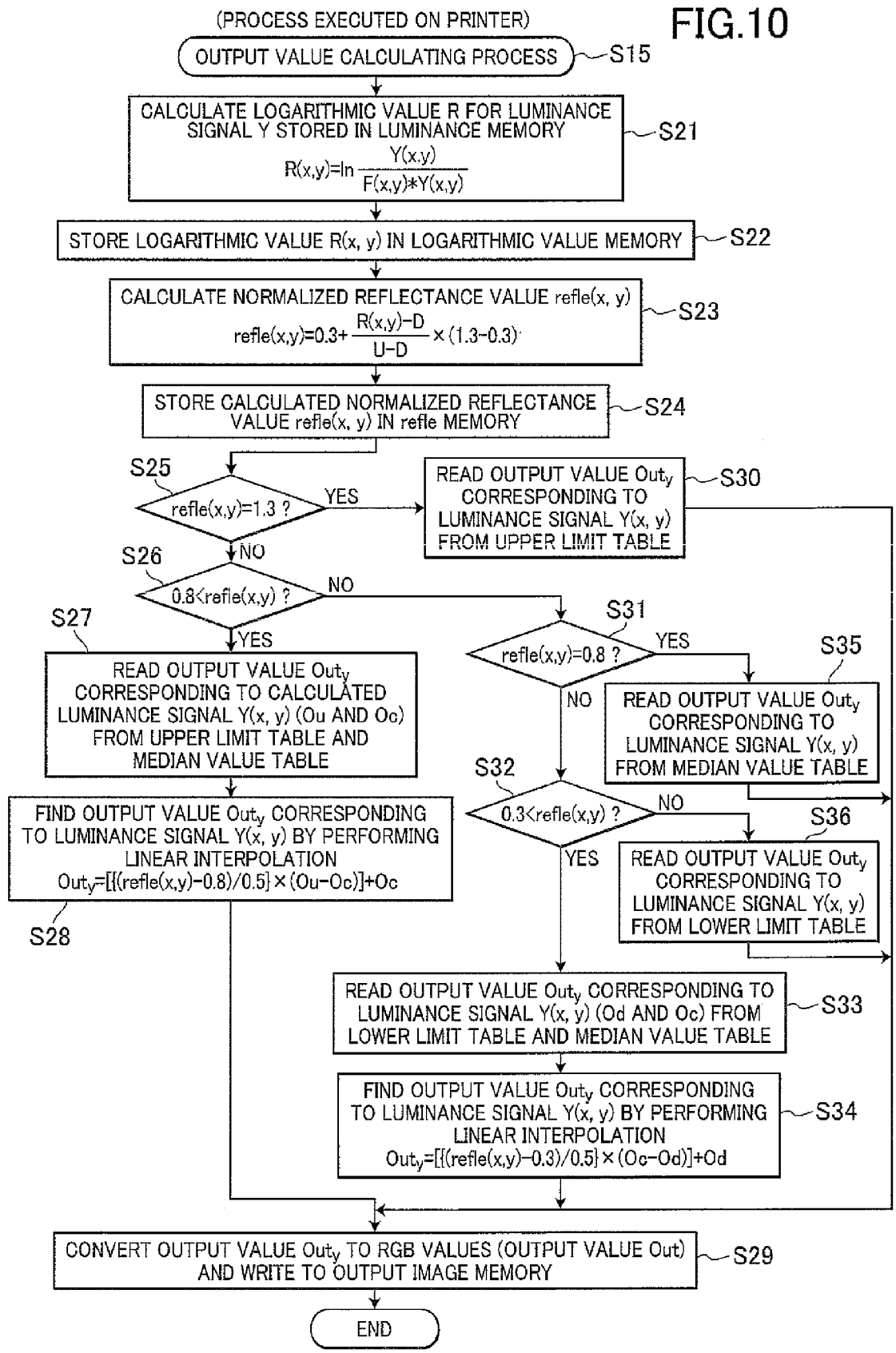
FIG. 10 is a flowchart illustrating steps in an output value calculating process executed during the correction process of FIG. 9.

The CPU 11 is an arithmetic processor that controls the overall operations of the printer 1. The ROM 12 stores various control programs executed by the CPU 11 and fixed values used when the CPU 11 executes programs. The ROM 12 includes an image processing program memory 12a, and a print control program memory 12b. The image processing program memory 12a stores the image processing program for performing such image processing as the Retinex process and the histogram process. The print control program memory 12b stores a print control program for executing a printing operation. The ROM 12 also includes an upper limit table 12c, a median value table 12d, a lower limit table 12e, and the like that are used for performing correction in the Retinex process. A program described in the flowcharts of FIGS. 9 and 10 is stored in the ROM 12 as part of the image-processing program 12a.

The upper limit table 12c, median value table 12d, and lower limit table 12e are employed to generate output values $Out_y$ that have been corrected according to the Retinex process. The tables store luminance signals Y in association with output values $Out_y$ as output for the luminance signals Y.

Each of the tables 12c-12e stores an output value $Out_y$ obtained through gamma correction in association with each luminance signal Y less than 128, and stores an output value $Out_y$ obtained not through gamma correction but according to a linear function, and specifically a monotonically increasing function.

In a conventional Retinex process, output values $Out_y$ are generated by performing gamma correction for all pixels in the original image without exception, but this technique results in over-correction. Hence, in the embodiment, the tables 12c-12e are configured to produce output values $Out_y$ for bright regions in the original image (regions with luminance signals Y having values greater than or equal to 128 in the embodiment) using a monotonically increasing function, i.e., a linear function, not using gamma correction.

Provided with the tables 12c-12e, the printer 1 can generate output image data based on data in the tables to subject the original image data to the Retinex process without performing gamma correction. Producing output values $Out_y$ using the tables 12c-12e avoids the problem of over-correction, which can result in a noticeable drop in quality in bright regions (regions having high luminance).

The original image data in this example is configured of raster data having pixel values (signal intensity values and RGB values) for each pixel forming the original image. In the embodiment, the original image data and output image data are configured of RGB values, each of which is a value in the range 0-255.

Specifically, the RGB values include components representing the three primary colors of light, i.e. an R value representing red, a G value representing green, and a B value representing blue. The combination of RGB values for each pixel of an input image indicates one color (hue, tone, etc.). The greater the RGB values, the higher the luminance (brightness).

Rather than performing the Retinex process directly on this original image data (RGB values), the printer 1 in the embodiment is configured to execute the Retinex process after converting RGB values in the original image data to luminance signals Y. Therefore, the tables 12c-12e store output values $Out_y$ found by correcting luminance signals Y according to the Retinex process in association with the luminance signals Y. Hence, the printer 1 can maintain the color balance of the original image in the processed output image better than when performing the Retinex process on each of the RGB values.

The luminance signals Y and chromatic signals Cb and Cr are calculated from the RGB values according to equation (5) below. However, since the RGB values fall within a predetermined range, the luminance signals Y also fall within a predetermined range, and specifically between 0 and 255.

$$\begin{pmatrix} Y \\ Cb \\ Cr \end{pmatrix} = \begin{pmatrix} 0.30 & 0.59 & 0.11 \\ -0.17 & -0.34 & 0.51 \\ 0.51 & -0.43 & -0.08 \end{pmatrix} \begin{pmatrix} R \\ G \\ B \end{pmatrix}. \quad \text{Equation (5)}$$

Accordingly, the signal intensity I(x, y) for the original image in equation (4) is set to the luminance signal Y(x, y) in the embodiment, and the luminance signal Y is subjected to the Retinex process to produce the output value $Out_y$, as shown in equation (4').

$$Out_y(x, y) = \frac{Y(x, y)}{\left(\frac{Y(x, y)}{255 \times refle(x, y)}\right)^{(1-1/\gamma)}} \quad \text{Equation (4')}$$

Since the gamma coefficient is an arbitrary constant, equation (4) or (4') for calculating the output value Out in the Retinex process has two variables (parameters), specifically the pixel value in the original image (the luminance signal Y) and the normalized reflectance value refle. Hence, by selecting the normalized reflectance value refle, it is possible to calculate each output value $Out_y$ corresponding to the luminance signal Y of each value 0-255 and to obtain table data to be stored in the tables 12c-12e.

In the embodiment, the tables 12c-12e store only output values $Out_y$ calculated according to equation (4') that are derived when the luminance signal Y is 0-127, as described above.

Obviously, more accurate output values $Out_y$ (output values $Out_y$ approaching values obtained in the calculation of equation (4)) can be obtained when output values $Out_y$ corresponding to multiple normalized reflectance values refle are provided as table data. However, an increase in table data is not preferable because a larger capacity of memory would be required.

Therefore, the ROM 12 in the embodiment stores three tables 12c-12e corresponding to three predetermined normalized reflectance values refle in order to obtain suitable output values $Out_y$ with a smaller number of tables. Further, as will be described later with reference to FIG. 10, the image-processing program 12a is configured for generating output values $Out_y$ in combination with linear interpolation to extract output values $Out_y$ from the tables 12c-12e based on the normalized reflectance value refle. In this way, the printer 1 can produce accurate output values $Out_y$ while suppressing the amount of memory required for storing table data.

More specifically, the upper limit table 12c, median value table 12d, and lower limit table 12e are provided for predetermined reflectance values (normalized reflectance values refle). The upper limit table 12c is formed for a normalized reflectance value refle of 1.3, the median value table 12d for a normalized reflectance value refle of 0.8 and the lower limit table 12e for a normalized reflectance value refle of 0.3.

As will be described later with reference to FIGS. 7A, 7B, and 8, the normalized reflectance value refle of 1.3 corresponds to the case of a positive logarithmic value R (when the target pixel is brighter than its peripheral pixels); the normalized reflectance value refle of 0.8 corresponds to the case when the logarithmic value R is 0 (when the target pixel has the same brightness as its peripheral pixels); and the normalized reflectance value refle of 0.3 corresponds to the case of a negative logarithmic value R (when the target pixel is darker than its peripheral pixels).

Figure 5:
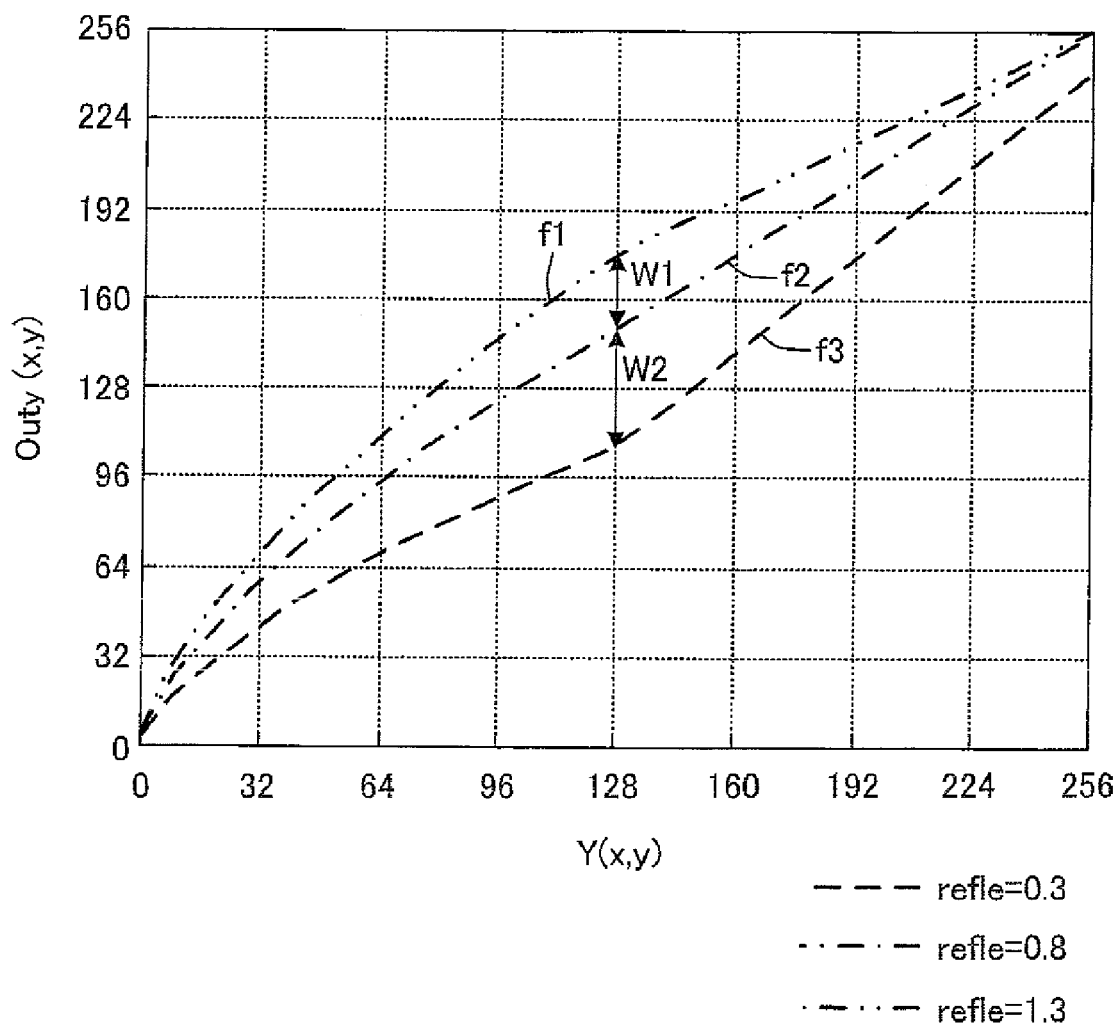
FIG. 5 is a graph illustrating the relationship between luminance signals and output values stored in the table of FIG. 4.

Next, the upper limit table 12c, median value table 12d, and lower limit table 12e will be described in detail with reference to FIGS. 4 and 5. FIG. 4 conceptually illustrates the structure of the tables 12c-12e. FIG. 5 is a graph showing the relationship between the luminance signals Y and output values $Out_y$ stored in the tables 12c-12e in FIG. 4 (the relationship for obtaining output values $Out_y$ from luminance signals Y).

In FIG. 4, the tables 12c-12e are displayed as lists. The luminance signals Y are displayed in the leftmost column as input values. Each of the tables 12c-12e stores values for each luminance signal Y within the range 0-255, but the tables in FIG. 4 display values only for every fourth value of the luminance signal Y (0, 4, 8, ...) and for 255. The left side list of FIG. 4 shows table in the range of the luminance signal Y from 0 to 128, whereas the right side list of FIG. 4 shows table in the range of the luminance signal Y from 132 to 255. Values for the output value $Out_y$ corresponding to other luminance signals Y have been omitted from the drawing. The three columns displaying output values $Out_y$ are arranged to the right of the column displaying the luminance signals Y. From left to right in each list of FIG. 4, the three columns displaying output values $Out_y$ correspond to the table data stored in the lower limit table 12e, median value table 12d, and upper limit table 12c. In other words, in order from left to right, the columns store output values $Out_y$ produced when the normalized reflectance value refle is 0.3, output values $Out_y$ produced when the normalized reflectance value refle is 0.6, and output values $Out_y$ produced when the normalized reflectance value refle is 1.3 in association with the luminance signals Y.

In FIG. 5 the horizontal axis represents the luminance signal Y, while the vertical axis represents the output value $Out_y$. A characteristic line f1 indicated by a double-dot chain line in FIG. 5 represents a function for generating output values $Out_y$ stored in the upper limit table 12c from luminance signals Y and, hence, plots table data in the upper limit table 12c. Similarly, a characteristic line f2 indicated by a single-dot chain line represents a function for generating output values $Out_y$ stored in the median value table 12d from the luminance signals Y and, hence, plots table data in the median value table 12d. A characteristic line f3 indicated by a dashed line represents a function for generating output values $Out_y$ stored in the lower limit table 12e from the luminance signals Y and, hence, plots table data in the lower limit table 12e.

The output values $Out_y$ indicated in the characteristic lines f1-f3 are all values obtained on these characteristic lines for each integer value of the luminance signal Y between 0 and 255. In other words, each of the output values $Out_y$ obtained from these characteristic lines are output values $Out_y$ stored in the corresponding tables 12c-12e shown in FIG. 4 in association with each value of the luminance signal Y between 0 and 255

Here, each characteristic line has a switching point where the value of luminance signal Y is 128. Specifically, the functions for generating the output values $Out_y$ are designed as the function shown in equation (4') using gamma correction for values of the luminance signal Y less than 128, and have a monotonically increasing linear function for values of the luminance signal Y greater than or equal to 128.

Specifically, the function for generating table data (output values Duty) stored in the upper limit table 12c uses a normalized reflectance value refle of 1.3 in equation (4') for values of the luminance signal Y less than 128. For values of the luminance signal Y between 128 and 254, a linear function with a slope of 0.62 and an intercept of 97.14 is used as an upper limit expression to generate output values $Out_y$ (y=0.62x+97.14).

As shown in FIG. 5, the output values $Out_y$ for luminance signals Y greater than or equal to 128 increase toward a value of 255 when the normalized reflectance value refle is 1.3. Even when the luminance signal Y is 254, the output value $Out_y$ does not exceed 255 (254.62 in this case). When the luminance signal Y is 255, the output value $Out_y$ is set to 255 independently of the upper limit expression (see FIG. 4).

In other words, when generating output values $Out_y$ according to the upper limit table 12c, the printer 1 generates an output value $Out_y$ of 255 when the luminance signal Y is 255 and generates output values $Out_y$ that do not exceed 255 when the luminance signal Y is approaching 255. Hence, this method prevents the occurrence of tone jump in which 255 is outputted for all values of the luminance signal Y greater than a fixed value.

Further, the printer 1 of the embodiment can set the brightest pixels (pixels having a luminance signal Y of 255) in the original image that are brighter than the peripheral pixels as the brightest pixels in the output image (pixels having an output value $Out_y$ of 255). When the pixels of the original image are the brightest pixels and are brighter than the peripheral pixels, decreasing the luminance of these pixels in the output image can make the output image appear strikingly darker than the original image. However, the printer 1 does not reduce this luminance in the output image, thereby maintaining the image quality.

As will be described later, the normalized reflectance value refle for each pixel in the original image has an upper limit of 1.3 in the embodiment. Further, the normalized reflectance value refle of a target pixel brighter than its peripheral pixels is a value exceeding 0.8 and no greater than 1.3. When the normalized reflectance value refle exceeds 0.8 and is less than 1.3, the output value $Out_y$ is generated by linear interpolation corresponding to the fraction (normalized reflectance −0.8)/0.5 (see FIG. 10). Hence, when 0.8<normalized reflectance value refle<1.3, the output value $Out_y$ increases toward any value greater than 248 (which is the maximum output value $Out_y$ when the normalized reflectance value refle is 0.8) and less than 255 (which is the maximum output value $Out_y$ when the normalized reflectance value refle is 1.3). Therefore, when the target pixel is brighter than its peripheral pixels (0.8<normalized reflectance value refle≦1.3), the maximum possible output value $Out_y$ corresponding to a luminance signal Y of 255 is 255.

A function for generating the table data (output values $Out_y$) stored in the median value table 12d uses a normalized reflectance value refle of 0.8 in equation (4') for values of the luminance signal Y less than 128. For values of the luminance signal Y between 128 and 254, a linear function with a slope of 0.77 and an intercept of 51.13 is used as a median value expression to generate output values $Out_y$ ($y=0.77x+51.13$). Accordingly, an output value $Out_y$ of 246.71 is generated when the luminance signal Y is 254 (not shown in FIG. 4). Further, the output value $Out_y$ is set to 248 irrespective of the median value expression when the luminance signal Y is 255 (see FIG. 4). Therefore, when generating output values $Out_y$ according to the median value table 12d, an output value $Out_y$ of 248 is generated when the luminance signal Y is 255, while output values $Out_y$ for values of luminance signal Y greater than or equal to 128 are generated without gamma correction so as to increase toward 248 as the value of luminance signal Y increases.

A function for generating the table data (output values $Out_y$) stored in the lower limit table 12e employs a normalized reflectance value refle of 0.3 in equation (4') for values of the luminance signal Y less than 128. For values of the luminance signal Y between 128 and 254, a linear function with a slope of 1.04 and an intercept of −25.33 is used as a lower limit expression to generate output values $Out_y$ ($y=1.04x=25.33$). Accordingly, an output value $Out_y$ of 238.83 is generated when the luminance signal Y is 254 (not shown in FIG. 4). Further, the output value $Out_y$ is set to 240 irrespective of the lower limit expression when the luminance signal Y is 255 (see FIG. 4). Therefore, when generating output values $Out_y$ according to the lower limit table 12e, the printer 1 generates an output value $Out_y$ of 240 when the luminance signal Y is 255 and generates output values $Out_y$ that increase toward 240 for increasing values of luminance signal Y greater than or equal to 128.

Further, the normalized reflectance value refle of each pixel in the original image has a lower limit of 0.3, as will be described later. In the embodiment, the normalized reflectance value refle of a target pixel that is darker than its peripheral pixels has a value less than 0.8 and greater than or equal to 0.3. When the normalized reflectance value refle exceeds 0.3 and is less than 0.8, the output value $Out_y$ is generated through linear interpolation based on the fraction (normalized reflectance −0.3)/0.5 (see FIG. 10). Hence, when 0.3<normalized reflectance value refle<0.8, the output value $Out_y$ increases toward any value greater than 240 (which is the maximum output value $Out_y$ for a normalized reflectance value refle of 0.3) and less than 248 (which is the maximum output value $Out_y$ for a normalized reflectance value refle of 0.8). Accordingly, when the target pixel is darker than its peripheral pixels (0.3≦normalized reflectance value refle<0.8), the lowest possible value of output value $Out_y$ for a luminance signal Y of 255 is 240, and never lower.

Using the tables 12c-12e in this way, it is possible to obtain output values $Out_y$ converted through gamma correction for luminance signals Y less than 128 in order to correct color tones through gamma correction operations (to accentuate contrast and increase luminance values). It is also possible to obtain output values $Out_y$ for values of the luminance signal Y greater than or equal to 128 by correcting the luminance signal Y with a linear function for gradually increasing the output value $Out_y$, rather than through gamma correction. As described above (see FIG. 2), when performing gamma correction in bright regions (larger values of the luminance signal Y), values produced from the same pixel values (luminance signals Y) of a target pixel vary greatly depending on the brightness relationship with its peripheral pixels. In the example of FIG. 2, an output value of 255 is found according to gamma correction for a pixel value of 255 in the original image when the logarithmic value R is positive (refle=1.3), while the output value reaches only about 170 when the logarithmic value R is negative (refle=0.3).

Over-correction (too much contrast) in which a slight difference in pixel value (value of the luminance signal Y) is greatly expanded occurs when a wide range of output values are assigned to the same pixel value. However, the lower limit table 12e provided in the printer 1 (the table corresponding to cases in which the logarithmic value R is negative, i.e., when the normalized reflectance value refle is the lower limit) sets an output value $Out_y$ of 240 for luminance signals Y of 255 in the original image, producing a value slightly larger than the value obtained in gamma correction. On the other hand, the upper limit table 12c (the table corresponding to cases in which the logarithmic value R is positive, i.e., when the normalized reflectance value refle is the upper limit) sets an output value $Out_y$ of 255 for luminance signals Y of 255 in the original image. Hence, the distribution range of possible values for the output value $Out_y$ in bright regions (regions with larger luminance signals Y) can be constrained to a narrow region than in the conventional process of performing gamma correction in the entire range, thereby greatly suppressing over-correction in which the contrast is over-accentuated in bright regions. Therefore, the printer 1 can increase luminance as needed in dark regions of the original image (regions with smaller luminance signal Y values; less than 128 in the embodiment) for correcting backlit regions, and can suppress over-correction in bright regions. In addition, since a suitable range of output values can be obtained for the same pixel value in intermediate regions where backlighting correction and the suppression of over-correction is unnecessary, contrast can be sufficiently accentuated in these intermediate regions.

With the tables 12c-12e in the embodiment described above, output values $Out_y$ are generated with a single linear function for the luminance signals Y from 128 to 254, and the output value $Out_y$ for the luminance signal Y value of 255 is set to a fixed value independent of the linear function. However, the tables may be configured to store output values $Out_y$ generated by a single linear function for all luminance signals Y in the range from the switching point (128 in the embodiment) to 255, or may be configured to store output values $Out_y$ generated according to a plurality of linear functions for luminance signals Y ranging from the switching point to 255.

As shown in FIG. 5, despite varying the normalized reflectance values refle of 0.3, 0.8, and 1.3 at equal intervals of 0.5 each, the intervals between the three characteristic lines f1-f3 are not uniform. For example, when the value of the luminance signal Y is 128, a difference W1 between the output value $Out_y$ for the normalized reflectance value refle of 1.3 and the output value $Out_y$ for the normalized reflectance value refle of 0.8 is clearly smaller than a difference W2 between the output value $Out_y$ for the normalized reflectance value refle of 0.8 and the output value $Out_y$ for the normalized reflectance value refle of 0.3. In other words, the output values $Out_y$ change nonlinearly in response to changes in the normalized reflectance values refle. Hence, when performing linear interpolation to generate output values $Out_y$ with the three tables 12c-12e, bias in the output values $Out_y$ relative to changes in the normalized reflectance value refle can be reflected in the interpolation, thereby producing more exact output values $Out_y$ when using such table data.

Since the gamma function used for gamma correction has a gradually decreasing rate of increase, eventually the output value $Out_y$ becomes smaller than the luminance signal Y, which is the input value, as the luminance signal Y increases. Hence, the boundary at which luminance signal Y≧output value $Out_y$ indicates an intersecting point between the curve of gamma correction function and a non-conversion straight line for setting the output value $Out_y$ to the value of the luminance signal Y without conversion (the linear function y=x) for each normalized reflectance value refle. As the luminance signal Y becomes larger than the intersecting point, the difference between the output value $Out_y$ found in gamma correction and the non-conversion straight line grows. This trend is particularly remarkable when the logarithmic value R is negative, i.e., when the normalized reflectance value refle is smaller (see FIG. 2).

When designing a function for producing an output value $Out_y$ of a value near 255 for the luminance signal Y having a value of 255, the slope a of the linear function increases as the switching point for switching from gamma correction to the linear function approaches 255 (after the intersecting point). Hence, when closer to 255, the switching point triggers an abrupt change in output values $Out_y$, leading to a decline in image quality. For this reason, the tables 12c-12e are configured to switch from gamma correction to the linear function near the midpoint. In other words, the switching point is set near the midpoint. This allows the slope a of the linear function to be a value adjacent to or less than 1 to produce a smooth rise in output values $Out_y$.

In the tables 12c-12e provided in the embodiment, the switching point is set to 128 in the luminance signals Y, but the switching point is not limited to this value. For example, the switching point may be set to an arbitrary value within a range greater than or equal to the luminance signal Y at an intersecting point where the non-conversion line (straight line y=x) intersects the characteristic line f3 shown in FIG. 5 and less than or equal to the luminance signal Y at an intersecting point where the non-conversion line intersects the characteristic line f2.

Figure 6:
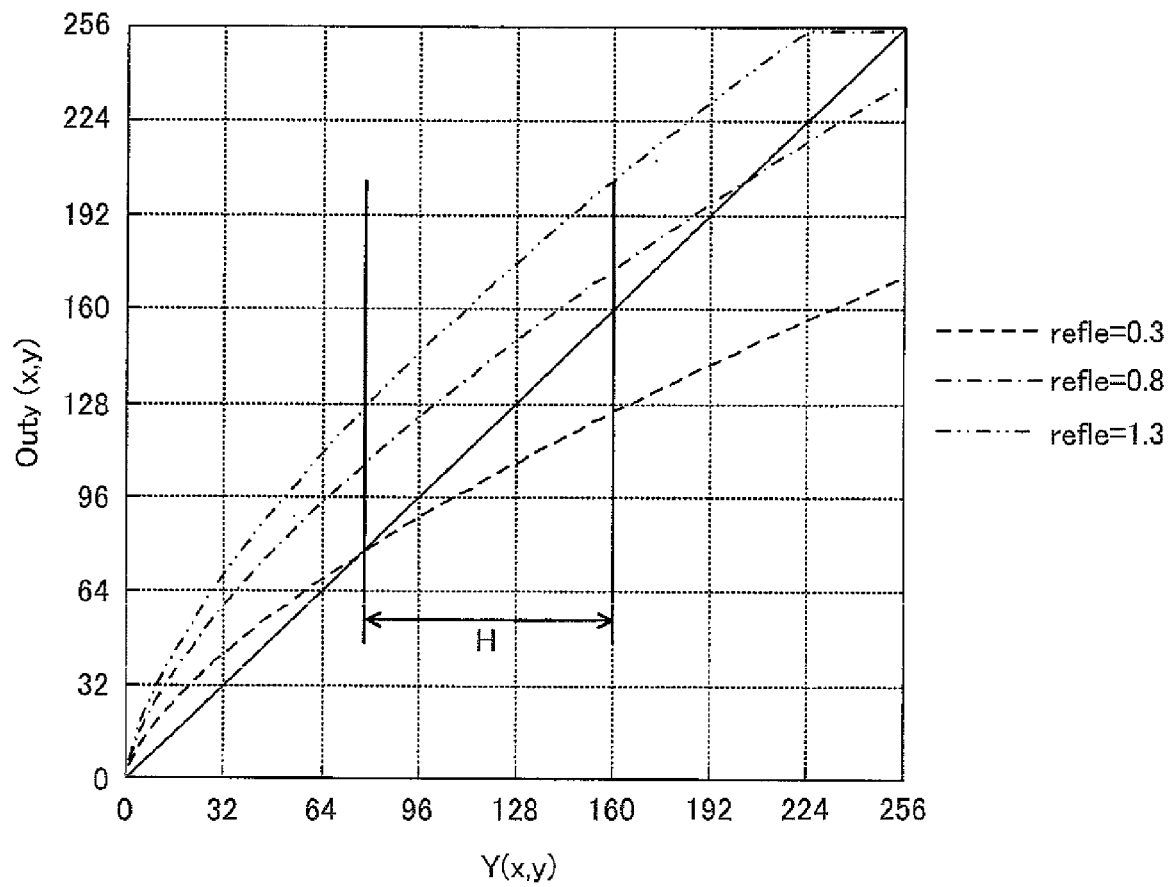
FIG. 6 is a graph illustrating a region in which a switching point is set for switching between gamma correction functions and linear functions.

A switching point may also be set according to the method described below. FIG. 6 illustrates a region in which a switching point is set for switching between gamma correction and linear function operations (a switching-point setting range H). In other words, the switching-point setting range H indicates the range of possible switching points.

FIG. 6 is a graph of equation (4'), which includes gamma correction, where the horizontal axis represents the luminance signal Y(x, y) of the original image data and the vertical axis represents the output value $Out_y$ produced through the Retinex process correction according to equation (4')). The curves depicted in FIG. 6 are based on specific normalized reflectance values refle (0.3, 0.8, and 1.3). Specifically, a dashed line indicates a curve for a normalized reflectance value refle of 0.3, a single-dot chain line indicates a curve for a normalized reflectance value refle of 0.8, and a double-dot chain line indicates a curve for a normalized reflectance value refle of 1.3. Further, the solid line depicts the non-conversion line (y=x).

In the embodiment, a monotonically increasing linear function is combined with gamma correction to suppress over-correction in bright regions. Problems in image quality can occur when simply using the linear function (monotonically increasing function) due to insufficient correction of backlit regions, insufficient contrast, and abrupt increases in pixel values. In other words, there is an optimal range of luminance signals Y that can be set as the switching point for switching between gamma correction functions and linear functions.

In the embodiment, the switching-point setting range H is set as the optimal range of switching points based on the following two provisions. The first provision stipulates that the switching point is a value greater than or equal to the intersecting point between the curve for a normalized reflectance value refle of 0.3 and the non-conversion line. Hence, this intersecting point is the lower limit of the switching-point setting range H.

As shown in FIG. 6, the output value $Out_y$ in gamma correction becomes gradually smaller than the inputted luminance signal Y as the luminance signal Y increases. A boundary point where luminance signal Y≧output value $Out_y$ denotes an intersecting point between the curve in gamma correction for each normalized reflectance value refle and the non-conversion line by which the output value $Out_y$ is set to the value of luminance signal Y without conversion. In other words, in the range smaller than the intersecting point, generated output values $Out_y$ are larger than the values of the luminance signal Y in the original image data.

Further, since 0.3 is the minimum value of calculated normalized reflectance values refle, the curve formed with this normalized reflectance value refle is the lowest curve in the graph, and the intersecting paint of this curve with the non-conversion line is the smallest value among intersecting points. If the switching point is positioned in a region smaller than the intersecting point between the curve for the normalized reflectance value refle of 0.3 and the non-conversion line, output values $Out_y$ generated according to the linear function when the normalized reflectance value refle is 0.3 may be lower than values generated according to the non-conversion line. In other words, it is not possible to produce output values greater than the original input value for regions of small pixel values that require backlighting correction (an increased luminance value), making backlighting correction impossible. Therefore, the switching-point setting range H in this example is set greater than the value of the intersecting point between the curve formed with the normalized reflectance value refle of 0.3 in FIG. 6 and the non-conversion line.

The second provision for setting the switching-point setting range H is that the gap (difference) between the curve for a normalized reflectance value refle of 0.3 and the curve for a normalized reflectance value refle of 1.3 is less than or equal to a predetermined width. As the luminance signal Y value increases after the intersecting point between the curve for the normalized reflectance value refle of 0.3 and the non-conversion line, the distance between the output values $Out_y$ generated for a normalized reflectance value refle of 0.3 and the output values $Out_y$ generated for a normalized reflectance value refle of 1.3 expands. Accordingly, the value of the luminance signal Y at which the two curves are separated by the predetermined width is set as the upper limit of the switching-point setting range H. Since the upper limit of the output values $Out_y$ is 255, the distance between the two curves actually reduces from approximately 224, even though the difference between the two curves is expected to expand according to calculations. However, in the embodiment, the upper limit of the switching-point setting range H is set to the value of the luminance signal Y at which the distance between the two curves reaches the predetermined width based on these calculations.

By having a width between the output value $Out_y$ when the normalized reflectance value refle is 0.3 and the output value $Out_y$ when the normalized reflectance value refle is 1.3 as described above, it is possible to accentuate contrast. However, applying a difference greater than needed between these output values $Out_y$ in regions where the value of the luminance signal Y is large can produce over-correction. By setting the switching point where the difference between these two curves reaches the predetermined width, it is possible to avoid an excessive difference between the output values $Out_y$ for a normalized reflectance value refle of 0.3 and the output values $Out_y$ for a normalized reflectance value refle of 1.3.

Since the output values $Out_y$ are generated according to a linear function after the switching point in this example, the interval between the characteristic line f3 for the normalized reflectance value refle of 0.3 and the characteristic line f1 for the normalized reflectance value refle of 1.3 can be set greatest at the switching point and gradually reduced as the luminance signal Y increases after the switching point, as shown in FIG. 5.

More specifically, the predetermined width in this example is set to 96, and the upper limit of the switching-point setting range H is set to 160, which is the value of luminance signal Y at which the interval between the two curves becomes 96. Here, the interval between the two curves defined by the switching-point setting range H is not limited to 96, but may be set to an arbitrary value between 64 and 96. If the predetermined width is set less than 64, then the interval between the characteristic lines f1 and f3 becomes too small to achieve sufficient contrast in the image. Further, if the predetermined width exceeds 96, the interval between the characteristic lines f1 and f3 is not sufficiently reduced in required regions, resulting in over-correction in bright regions. In addition, if the predetermined width is greater than 96, the switching point becomes too close to the maximum value of the luminance signal Y, resulting in an abrupt increase in the output values $Out_y$ within a narrow range near the maximum value that can degrade image quality. Therefore, the interval between the two lines defined by the switching-point setting range H is set between 64 and 96.

The switching point can be set to an arbitrary value within the switching-point setting range H defined by the above two provisions. By defining the switching-point setting range H in this way, it is possible to correct backlighting (increase luminance) through gamma correction in backlit regions of the original image and to suppress over-correction in bright regions.

The switching point can be set to an arbitrary value within the switching-point setting range H for each of the characteristic lines f1-f3. In this case, it is preferable to set the switching point to a position (a value of the luminance signal Y) at which the output value $Out_y$ found for the same value of luminance signal Y is a larger value when the normalized reflectance value refle is larger. In other words, the switching point is set so that the characteristic lines f1-f3 do not intersect for luminance signals Y of 0-255. Therefore, target pixels having the same brightness as their peripheral pixels produce a greater output value $Out_y$ than target pixels that are darker than the peripheral pixels and, similarly, target pixels that are brighter than the peripheral pixels produce a larger output value $Out_y$ than target pixels having the same brightness as their peripheral pixels. Therefore, the printer 1 can form output images conforming to the order of intensities in the original image.

Further, in this example, a value near the midpoint of luminance signals Y (128) and within the switching-point setting range H is used as the switching point.

While over-correction produced during gamma correction is more noticeable in bright regions as the output value approaches the maximum value, image quality is still improved by accentuating contrast up to a point near the maximum value. Therefore, by setting the switching point near the midpoint of luminance signal Y values, a sufficient distance can be maintained between the characteristic line f1 for the normalized reflectance value refle of 1.3 and the characteristic line f3 for the normalized reflectance value refle of 0.3 in the intermediate region for which over-correction is not a problem, thereby achieving suitable contrast in these regions of the output image.

Further, by setting the switching point near the midpoint of the luminance signal Y values, the characteristic line f3 for a normalized reflectance value refle of 0.3 can be gradually increased from the midpoint of the luminance signals Y to the maximum value, as shown in FIG. 5, because the slope a of the linear function can be set to a value near or less than 1. Accordingly, the output values $Out_y$ can be increased at a sufficiently gentle pace, reliably avoiding an abrupt increase in the output values $Out_y$ within a short range.

In the embodiment described above, the luminance signal Y value of 128 is set as the switching point in the tables 12c-12e, but the switching point is not limited to 128.

Further, in the embodiment described above, table data in each of the tables 12c-12e has a switching point set at the luminance signal Y value of 128, but the table data for the tables 12c-12e may have different switching points.

Here, the way of configuring the data content in tables stored in the printer 1, i.e., the way to design normalized reflectance values refle used to form the table data is an important factor for producing accurate output values $Out_y$ with a small number of tables.

Next, a detailed description will be given of the normalized reflectance values refle used to form the tables 12c-12e stored in the printer 1, while referring to FIGS. 7A, 7B, and 8.

Figure 7A:
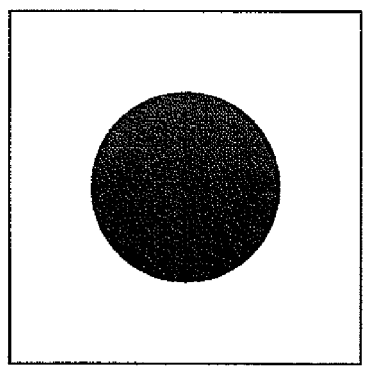
FIG. 7A is an explanatory diagram showing an image taken under backlit conditions.
Figure 7B:
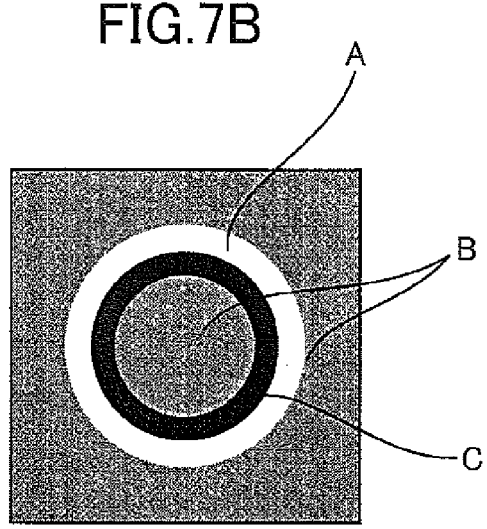
FIG. 7B is an explanatory diagram showing an image formed by converting each pixel value in the image of FIG. 7A to reflectance values (logarithmic values)

FIGS. 7A and 7B illustrate the relationship between the logarithmic value R found from the original image data and the original image. FIG. 7A shows an original image conceptually depicting a backlit image. The original image is rectangular in shape and has a circular backlit region in the center thereof. FIG. 7B shows an image formed by converting each pixel value in the original image to a reflectance (logarithmic value R). Here, the logarithmic value R is a value indicating the difference between the value of a target pixel and the average luminance of its peripheral pixels, i.e., a value representing the difference in brightness between the target pixel and its peripheral pixels. In the converted image, a region A depicted in white denotes a region in which the logarithmic value R is positive; a region C depicted in black denotes a region in which the logarithmic value R is negative; and a region B depicted in gray denotes a region in which the logarithmic value R is 0.

A positive value of the logarithmic value R indicates that the target pixel is brighter than its peripheral pixels and, conversely, a negative value of the logarithmic value R indicates that the target pixel is darker than its peripheral pixels. When the logarithmic value R is 0, the target pixel has the same brightness as its peripheral pixels.

In most cases, the brightness is uniform in each region of the original image. Most of the backlit region is uniformly dark, while regions other than the backlit region are uniformly bright. As shown in the converted image, only a few pixels belonging to specific areas of the image, such as near the outline of the object or near the border between the backlit region and the non-backlit region are brighter or darker than their peripheral pixels.

FIG. 8 shows a histogram of logarithmic values R for a common image including the image depicted in FIGS. 7A and 7B. The histogram in FIG. 8 shows the results of tabulating logarithmic values R for all pixels in the original image, where the horizontal axis represents the logarithmic value R and the vertical axis represents the number of pixels. A median value M, given the value 0, is set at the peak of the logarithmic values R in the histogram so that the logarithmic values R are distributed fairly symmetrically on both sides of the median value M. Further, the logarithmic values R are concentrated near the median value M (that is, where the logarithmic value R=0), indicating that target pixels and their peripheral pixels have substantially the same brightness in most regions of the original image. A mode value of logarithmic values R is also zero. In other words, the histogram indicates that the majority of logarithmic values K for pixels in the original image are 0 (near 0).

Note that a logarithmic value R is obtained by subtracting the logarithm of a peripheral average luminance from the logarithm of a pixel value (luminance signal) of a subject pixel.

The printer 1 is configured to generate output values $Out_y$ using table data corresponding to the case when the logarithmic value R is 0 (the median value table 12d) since the logarithmic value R for most pixels is 0 or near 0. Hence, by using output values $Out_y$ calculated when the logarithmic value R is 0 as the table data, it is possible to improve the accuracy of generating output values $Out_y$ using table data. In fact, the results of calculations performed using the logarithmic value R=0 for the reflected light component in equation (4') are infinitely large. Therefore, a normalized reflectance value refle found by normalizing the calculated logarithmic value R is used.

When normalizing the logarithmic value R, it is necessary to define a clipped range for normalization (normalizing range). In the embodiment, an upper limit U of the logarithmic values R is set to the upper point of a range greater than the median value M and including 45% of the pixels; a lower limit D of logarithmic values R is set to the lower point of a range smaller than the median value M including 45% of the pixels; and the clipped range is set to the range between the lower limit D and the upper limit U. Next, the logarithmic values R in the clipped range are normalized to a predetermined range between a lower limit d and an upper limit u. Normalization is performed by setting the lower limit d to a logarithmic value R less than or equal to the lower limit D and the upper limit u to a logarithmic value R greater than or equal to the upper limit U, and by converting the logarithmic values R in the clipped range between the lower limit D and the upper limit U to values in the range from the lower limit d to the upper limit u with a linear or nonlinear function. The output values $Out_y$ stored in the tables 12c-12e are calculated using the normalized reflectance value refle found through this normalization. While this clipped range contains 45% of the pixels both above and below the median value M, the number of pixels above and below the median value M is not limited to 45% and may be greater than or less than this percentage.

When designing the tables 12c-12e used in the embodiment, the logarithmic values R are normalized to satisfy the following two conditions. The first condition is that the normalized reflectance values refle obtained through normalization must not include the value 0 to avoid cases in which the output value $Out_y$ cannot be calculated, as described above.

The second condition is that the normalized reflectance values refle should have a width of 1. When the normalized reflectance values refle have a width of 1, it is possible to set the dynamic range of the output image substantially the same as the dynamic range of the original image. Since the pixel values of the original image fall within the range from 0 to 255, pixel values for the output image within the same range of 0-255 can be obtained in the embodiment by setting the width of the normalized reflectance values refle to 1, preventing an overall change in color tone in the output image compared with the input image.

Accordingly, the logarithmic values R are normalized to values within a range from the lower limit d, which is a value greater than 0, and the upper limit u found by adding 1 to the lower limit d. In the embodiment, the lower limit d in equation (3) is set to 0.3 and the upper limit u to 1.3 so that the logarithmic values R are normalized to values within 0.3-1.3. In other words, the normalized reflectance value refle of each pixel in the original image is set to a value between 0.3 and 1.3. When the logarithmic values R are normalized to the range 0.3-1.3, the normalized reflectance value refle for a logarithmic value R of 0 is 0.8. Hence, the target pixel has a positive logarithmic value R when the normalized reflectance value refle exceeds 0.8, indicating that the target pixel is brighter than its peripheral pixels, and has a negative logarithmic value R when the normalized reflectance value refle is less than 0.8, indicating that the target pixel is darker than its peripheral pixels.

In the embodiment, the upper limit table 12c, median value table 12d, and lower limit table 12e have been formed for cases in which the normalized reflectance value refle is 1.3, 0.8, and 0.3, respectively. Specifically, the upper limit table 12c is formed using the upper limit of the normalized reflectance value refle (when logarithmic value R is positive), the lower limit table 12e is formed using the lower limit of the normalized reflectance value refle (when logarithmic value R is negative), and the median value table 12d is formed using the normalized reflectance value refle when the logarithmic value R=0, as described above.

The printer 1 also normalizes logarithmic values R calculated from the inputted original image to values within the range 0.3-1.3. Hence, in the printer 1, the normalized reflectance values refle of logarithmic values R calculated from the inputted original image and the normalized reflectance values refle used to form the tables 12c-12e have the same range and can therefore be matched. Accordingly, precise output values $Out_y$ can be generated using the three tables 12c-12e.

In addition, by providing the upper limit table 12c and lower limit table 12e, the printer 1 can derive output values $Out_y$ corresponding to all normalized reflectance values refle calculated from an original image inputted into the printer 1 by performing interpolation using table data stored in the tables 12c-12e.

While the normalized reflectance values refle are set to values within the range 0.3-1.3 in the embodiment, the invention is not limited to this range of normalized reflectance values refle. For example, the range of normalized reflectance values refle may be set to 0.1-1.1 or 0.4-1.4 for the same clipped range. Further, the width of normalized reflectance values refle need not be strictly 1, but may be set to a smaller range than 1, such as 0.9, or a larger range than 1, such as 1.5.

Referring to FIG. 3 again, the RAM 13 is a rewritable random access memory that includes a work area for storing a set of registers required when the CPU 11 executes the control programs, and a temporary area for temporarily storing data during such processes. The RAM 13 includes an original image memory 13a for storing original image data; a reduced Retinex image memory 13b for storing reflectance values (logarithmic values Rs) found by reducing the original image and performing the Retinex process on the reduced image; a histogram memory 13c for storing a histogram of the logarithmic values Rs (frequency distribution); a maximum value memory 13d for storing the maximum reflectance value in the reduced image (logarithmic value Rs); a minimum value memory 13e for storing the minimum reflectance value in the reduced image (logarithmic value Rs); a luminance memory 13f for storing luminance signals Y generated from RGB values for the original image; a logarithmic value memory 13g for storing reflectance values (reflected light component and logarithmic value R) for the original image; a refle memory 13h for storing normalized reflectance values refle; and an output image memory 13i for storing output image data corrected through the Retinex process. Here, "s" is a suffix added to indicate the reduced image and is not added for the original image.

The original image data memory 13a stores image data inputted from the PC 2, digital camera 21, and external medium 20 via the interface 17, interface 18, and external media slot 19, respectively. When new image data is inputted into the printer 1, original image data stored in the original image memory 13a is overwritten with the newly inputted image data.

The reflectance memory 13b is a memory area used in the Retinex process for storing logarithmic values Rs(x, y) obtained from luminance values of the original image after the original image is compressed (reduced).

The original image is compressed according to a method well known in the art, such as the nearest neighbor method for sampling a value of a pixel nearest a position of the original image corresponding to a pixel of the reduced image and for using the sampled pixel value, or the bi-cubic method or average pixel method for performing interpolation using pixels surrounding a position in the original image corresponding to a pixel of the reduced image. The nearest neighbor method is used when processing speed is given priority over image quality, and the bi-cubic method or average pixel method is used when giving priority to image quality over processing speed.

The printer 1 reduces the original image according to one of the above methods, calculates the logarithmic value Rs for each pixel in the reduced image using equation (2) described above, and stores the logarithmic value Rs for each pixel in the reduced Retinex image memory 13b in association with its coordinates (x, y) When executing a new correction process, values already stored in the reduced Retinex image memory 13b are updated with the new values. The logarithmic value Rs is calculated by using a luminance signal Ys(x, y) for the signal intensity I(x, y) of the original image in equation (2).

The histogram memory 13c stores results of tabulating the number of pixels having the same reflectance level for the reflectance values (logarithmic values Rs) stored in the reduced Retinex image memory 13b. The histogram memory 13c is provided with a memory area corresponding to each reflectance level. Hence, the histogram memory 13c functions to form a histogram of logarithmic values Rs.

The CPU 11 sets the number of memory areas in the histogram memory 13c and the level of the logarithmic value Rs managed in each area when a new original image is inputted into the printer 1. Specifically, after the logarithmic value Rs is found for all pixels constituting the reduced image, the CPU 11 determines a range for producing a histogram based on maximum and minimum values of logarithmic values Rs and selects a range of levels to be tabulated (managed levels), thereby setting the number of areas in the histogram memory 13c and the level for each area.

After determining to which level a logarithmic value Rs stored in the reduced Retinex image memory 13b belongs, the CPU 11 increments the value stored in the memory corresponding to the determined level of the logarithmic value Rs. In this way, the CPU 11 tabulates the number of pixels for each level.

After determining the levels for all logarithmic values Rs stored in the reduced Retinex image memory 13b, the CPU 11 can determine a median value M from the tabulation results stored in the histogram memory 13c and set an upper limit U and a lower limit D. The printer 1 uses the range from the lower limit D to the upper limit U determined from the tabulation results as the clipped range for the original image data stored in the original image memory 13a.

In this way, the printer 1 can set a clipped range for the original image formed from the reduced image. This method eliminates the need to generate a histogram for all pixels in the original image, thereby reducing the processing time for setting the clipped range.

The maximum value memory 13d and minimum value memory 13e store a maximum value and minimum value, respectively, of the logarithmic values Rs stored in the reduced Retinex image memory 13b, which values are used for generating the histogram. A value of 0 is written to the maximum value memory 13d and minimum value memory 13e at the beginning of the correction process in which the Retinex process is performed on the original image. After each logarithmic value Rs is calculated and stored in the reduced Retinex image memory 13b, the calculated logarithmic value Rs is compared with the value stored in the maximum value memory 13d. If the new logarithmic value Rs is larger than the value stored in the maximum value memory 13d, then the maximum value memory 13d is updated to reflect the new value.

Further, when the newly calculated logarithmic value Rs is smaller than the value stored in the maximum value memory 13d, this logarithmic value Rs is compared with the value stored in the minimum value memory 13e. If the newly calculated logarithmic value Rs is smaller than the value stored in the minimum value memory 13e, then the minimum value memory 13e is updated to reflect the new value.

As a result of this process, the maximum value memory 13d saves the maximum value of logarithmic values Rs stored in the reduced Retinex image memory 13b, and the minimum value memory 13e stores the minimum value of logarithmic values Rs stored in the reduced Retinex image memory 13b.

The CPU 11 references the maximum and minimum values stored in the maximum value memory 13d and minimum value memory 13e when generating the histogram and determines the range for generating the histogram based on these maximum and minimum values.

The luminance memory 13f stores a luminance signal Y (luminance signal Ys) and the chromatic signals Cb and Cr calculated from RGB values using equation (5). As described above, the printer 1 does not perform the Retinex process directly on original image data (RGB values) for the inputted original image, but performs the Retinex process after converting the RGB values to luminance signals Y. The luminance signals Y and the like converted from RGB values are stored in the luminance memory 13f in association with the coordinates (x, y) for the source RGB values. The printer 1 generates reflectance values and output values $Out_y$ based on the luminance signals Y or Ys stored in the luminance memory 13f.

In order to generate the output values $Out_y$ of the output image, the printer 1 calculates reflectance values (logarithmic values Rs and R) twice from both the reduced image and the original image. When calculating reflectance values, the printer 1 generates the luminance signals Ys or Y from RGB values for the source image data (reduced image data or original image data) and writes these values to the luminance memory 13f. The printer 1 first generates the luminance signals Ys for the reduced image and stores these luminance signals Ys in the luminance memory 13f. When the printer 1 subsequently generates the luminance signals Y for the original image, the printer 1 resets the luminance signals Ys stored in the luminance memory 13f to 0 and stores the luminance signals Y and the like newly generated from the RGB values of the original image data in the luminance memory 13f.

The logarithmic value memory 13g functions to store logarithmic values R, which are reflectance values calculated from the original image data. More specifically, the CPU 11 uses the luminance signals Y fox the original image data stored in the luminance memory 13f to calculate the logarithmic value R(x, y) corresponding to each pixel according to equation (2') shown below and stores the calculated logarithmic value R(x, y) in the logarithmic value memory 13g in association with its coordinates. Values in the logarithmic value memory 13g are updated each time a new correction process is executed.

$$R(x, y) \equiv \ln \frac{Y(x, y)}{F(x, y) * Y(x, y)} \quad \text{Equation (2')}$$

The refle memory 13h functions to store the normalized reflectance values refle obtained by normalizing the logarithmic values R stored in the logarithmic value memory 13g. The normalized reflectance values refle stored in the refle memory 13h are produced by normalizing each logarithmic value R(x, y) stored in the logarithmic value memory 13g to a value within a range from a lower limit 0.3 to an upper limit 1.3 according to equation (3). A normalized reflectance value refle(x, y) is generated for each logarithmic value R(x, y) and written to the refle memory 13h in association with the coordinates. The printer 1 reads the normalized reflectance values refle from the refle memory 13h when generating the output values $Out_y$ and selects at least one of the tables 12c-12e corresponding to the normalized reflectance value refle read from the refle memory 13h for obtaining the output value $Out_y$.

The output image memory 13i functions to store output image data to be outputted to the printing unit 15. The output image data stored in the output image memory 13i is output values Out generated from the original image according to the correction process and is configured of RGB values for each pixel forming the output image. As described above, the output value $Out_y$ corresponding to the luminance signal Y(x, y) of the original image is obtained from at least one of the tables 12c-12e in the embodiment. Since the output value $Out_y$ obtained from the tables 12c-12e is a luminance signal Y, the output value $out_y$ is converted to RGB values according to equation (6) shown below after performing any necessary linear interpolation and the like, to obtain an output value Out.

$$\begin{pmatrix} R \\ G \\ B \end{pmatrix} = \begin{pmatrix} 1.0 & 0 & 1.37 \\ 1.0 & -0.34 & -0.70 \\ 1.0 & 1.73 & 0 \end{pmatrix} \begin{pmatrix} Y \\ Cb \\ Cr \end{pmatrix} \quad \text{Equation (6)}$$

The printer 1 calculates one output value $Out_y(x, y)$ for each luminance signal Y(x, y) of the original image and generates an output value Out(x, y) corresponding to each output value $Out_y(x, y)$. The printer 1 writes the output value Out(x, y) generated above in the output image memory 13i in association with the coordinates. When executing a printing operation, the printer 1 reads the output value Out (output image data) from the output image memory 13i and outputs this data to the printing unit 15. After outputting the output values Out to the printing unit 15, the values are deleted from the output image memory 13i.

Next, the correction process executed on the printer 1 having the above construction will be described with reference to the flowcharts in FIGS. 9 and 10. The correction process is implemented based on the image-processing program 12a described above and produces output image data by performing the Retinex process on inputted image data (original image data).

In S1 of the correction process, the CPU 11 reads the original image data from the original image memory 13a. In S2 the CPU 11 forms a reduced image, converts the RGB values in the reduced image to luminance signals Ys and chromatic signals Cb and Cr, and writes these values to the luminance memory 13f in correspondence with the coordinates (x, y) of the respective RGB values. In this way, luminance signals Ys corresponding to all pixels in the reduced image are stored in the luminance memory 13f.

In S3 the CPU 11 calculates a reflectance value (logarithmic values Rs) for a luminance signal Ys of the reduced image stored in the luminance memory 13f. Specifically, the CPU 11 calculates the logarithmic value Rs(x, y) for a pixel using the luminance signal Ys(x, y) as the signal intensity I(x, y) in equation (2) (that is, substituting R(x, y) with Rs(x, y) and substituting Y(x, y) with Ys (x, y) in equation (2')). More specifically, the CPU 11 performs convolution with a Gaussian filter F(x, y) on an m×n region including a target pixel at coordinates (x, y), finds an average luminance value of peripheral pixels, averaged while adding weight to the peripheral pixels based on their distance from the target pixel, and calculates the logarithmic value Rs(x, y), which is the reflectance value of the target pixel, finding a natural logarithm by dividing the luminance signal Ys(x, y) of the target pixel with the average luminance value.

In S4 the CPU 11 stores the logarithmic value R(x, y) calculated in S3 in the reduced Retinex image memory 13b and in S5 determines whether the logarithmic value Rs(x, y) is greater than the value stored in the maximum value memory 13d. If the logarithmic value Rs(x, y) is greater than the value stored in the maximum value memory 13d (S5: YES), then in S6 the CPU 11 overwrites the values stored in the maximum value memory 13d with the new logarithmic value Rs(x, y). However, if the logarithmic value Rs(x, y) is smaller than the value stored in the maximum value memory 13d (S5: NO), then in S7 the CPU 11 determines whether the logarithmic value Rs is smaller than the values stored in the minimum value memory 13e. If the logarithmic value Rs is smaller than the value stored in the minimum value memory 13e (S7: YES), then in SB the CPU 11 overwrites the value stored in the minimum value memory 13e with the new logarithmic value Rs.

After completing the process in S6 or S8, the CPU 11 determines in S9 whether the process has been completed for all pixels in the reduced image. In this way, the CPU 11 repeats the process in S3-S8 for each target pixel (each luminance signal Ys) until the process has been completed for all luminance signals Ys in order to generate the logarithmic values Rs for each pixel in the reduced image and to determine maximum and minimum values of the logarithmic values Rs. Hence, a luminance signal Ys is read from the luminance memory 13f each time the process in S3-S8 is executed in an order conforming to the coordinates (the order of a raster scan from the first coordinates to the last coordinates). When the CPU 11 determines in S9 that the process has been completed for all pixels (S9: YES), in S10 the CPU 11 forms a histogram for the logarithmic values Rs stored in the reduced Retinex image memory 13b within a range from the maximum value stored in the maximum value memory 13d to the minimum value stored in the minimum value memory 13e.

In S11 the CPU 11 finds the median value M from the histogram formed in S10 and in S12 sets a clipped range of logarithmic values Rs (upper limit U and lower limit D) from the median value M and the histogram. Specifically, the CPU 11 sets the upper limit U to the logarithmic value Rs at an upper point of a range greater than the median value M that includes 45% of the pixels, sets the lower limit D to the logarithmic value Rs at a lower point of a range less than the median value N that includes 45% of the pixels, and sets the clipped range to the range between the lower limit D and the upper limit U including 45% of the pixels both greater than and less than the median value M.

In S13 the CPU 11 resets the luminance memory 13$f$ to 0. In S14 the CPU 11 converts RGB values in the original image data stored in the original image memory 13$a$ to luminance signals Y and chromatic signals Cb and Cr and writes these values to the luminance memory 13$f$ in correspondence with the coordinates (x, y) of the corresponding RGB values. In S15 the CPU 11 executes an output value calculating process for generating output image data. In S16 the CPU 11 determines whether the output value calculating process of S15 has been performed for all pixels in the original image. While there remain pixels in the original image that have not been converted to output values Out (S16: NO), the CPU 11 returns to S15 and repeats the process in S15 until output values Out have been generated for all pixels in the original image. Once all pixels of the original image have been converted to output values Out (S16: YES), the CPU 11 ends the correction process.

However, if the CPU 11 determines in S7 that the logarithmic value Rs is greater than or equal to the value stored in the minimum value memory 13$e$ (S7: NO), then the CPU 11 skips to the process of S9, since there is no need to update the value in the minimum value memory 13$e$. Further, if the CPU 11 determines in S9 that the process for generating logarithmic values Rs and determining the maximum and minimum values of the logarithmic values Rs has not been completed for all pixels in the reduced image (S9: NO), then the CPU 11 returns to S3 and repeats the process in S3-S9 until the process has been completed for all luminance signals Y.

FIG. 10 is a flowchart illustrating steps in the output value calculating process of S15 executed during the correction process of FIG. 9. The CPU 11 executes the output value calculating process for each target pixel (each luminance signal Y). The CPU 11 reads a luminance signal Y from the luminance memory 13$f$ each time the output value calculating process is executed in an order conforming to the coordinates (in the raster scanning order from the initial coordinates to the final coordinates) and repeats the process until the luminance signal Y for the last pixel has been processed.

Through the output value calculating process of S15 the CPU 11 calculates reflectance values (logarithmic values R) for the luminance signals Y stored in the luminance memory 13$f$. As described above, the CPU 11 finds the luminance signal Y for each pixel in the original image and stores this luminance signal Y in the luminance memory 13$f$ in association with its coordinates (x, y) In S21 of FIG. 9 the CPU 11 calculates the logarithmic value R(x, y) for each pixel using the luminance signal Y(x, y) based on equation (2').

In S22 the CPU 11 stores the logarithmic value R calculated above in the logarithmic value memory 13$g$. In S23 the CPU 11 calculates the normalized reflectance value refle(x, y) by normalizing the logarithmic value R stored in the logarithmic value memory 13$g$ to a value within the range 0.3-1.3 set as the range between the lower limit D and upper limit U in S12.

In the normalization process, the CPU 11 sets the logarithmic value R to 0.3 when the logarithmic value R(x, y)≦D, sets the logarithmic value R to 1.3 when the logarithmic value R(x, y)≧U, and normalizes the logarithmic value R according to equation (3) when D<logarithmic value R(x, y)<U. In the embodiment, d and u in equation (3) are set to 0.3 and 1.3, respectively.

In S24 the CPU 11 stores the normalized reflectance value refle(x, y) calculated above in the refle memory 13$h$ in association with its coordinates. In S25 the CPU 11 determines whether the normalized reflectance value refle(x, y) is 1.3. If the normalized reflectance value refle(x, y) is not 1.3 (S25: NO), indicating that the normalized reflectance value refle(x, y) is less than 1.3, then in S26 the CPU 11 determines whether the normalized reflectance value refle(x, y) is greater than 0.8. Hence, through the process of S26 the CPU 11 determines whether the normalized reflectance value refle is within the range greater than 0.8 and less than 1.3. If the normalized reflectance value refle(x, y) is greater than 0.8 (S26: YES), then in S27 the CPU 11 reads the output value Out$_y$ corresponding to the luminance signal Y(x, y) read from the luminance memory 13$f$ from both the upper limit table 12$c$ and median value table 12$d$, setting Ou to the output value Out$_y$ read from the upper limit table 12$c$ and Oc to the output value Out$_y$ read from the median value table 12$d$.

In S28 the CPU 11 performs linear interpolation on the output values Ou and Oc based on the normalized reflectance value refle(x, y) according to equation (7) below to find the output value Out$_y$ corresponding to the luminance signal Y(x, y).

$$\text{Out}_y = [\{(refle(x,y)-0.8)/0.5\} \times (Ou-Oc)] + Oc \qquad \text{Equation (7)}$$

In S29 the CPU 11 converts the output value Out$_y$ found in S28 back to RGB values according to equation (6) to generate an output value Out and writes the output value Out to the output image memory 13$i$ in association with the coordinates (x, y) of the source luminance signal Y. Subsequently, the CPU 11 ends the output value calculating process.

However, if the CPU 11 determines in S25 that the normalized reflectance value refle(x, y) is 1.3 (S25: YES), then in S30 the CPU 11 reads the output value Out$_y$ corresponding to the luminance signal Y(x, y) from the upper limit table 12$c$ and subsequently advances to S29.

Further, if the CPU 11 determines in S26 that the normalized reflectance value refle(x, y) does not exceed 0.8 (S26: NO), then in S31 the CPU 11 determines whether the normalized reflectance value refle(x, y) is 0.8. If the normalized reflectance value refle is not 0.8 (S31: NO), indicating that the normalized reflectance value refle is less than 0.8, then in S32 the CPU 11 determines whether the normalized reflectance value refle(x, y) exceeds 0.3. In other words, through S32 the CPU 11 determines whether the normalized reflectance value refle is within the range greater than 0.3 and less than 0.8. If the normalized reflectance value refle(x, y) exceeds 0.3 (S32: YES), then in S33 the CPU 11 reads the output value Out$_y$ corresponding to the luminance signal Y(x, y) read from the luminance memory 13$f$ from both the lower limit table 12$e$ and the median value table 12$d$, setting Oc to the output value Out$_y$ read from the median value table 12$d$ and Od to the output value Out$_y$ read from the lower limit table 12$e$. In S34 the CPU 11 performs linear interpolation on the output values Oc and Od read above based on the normalized reflectance value refle(x, y) using equation (8) below to find the output value Out$_y$ corresponding to the luminance signal Y(x, y). Subsequently, the CPU 11 advances to S29.

$$\text{Out}_y = [\{(refle(x,y)-0.3)/0.5\} \times (Oc-Od)] + Od \qquad \text{Equation (8)}$$

Further, if the CPU 11 determines in S31 that the normalized reflectance value refle is 0.8 (S31: YES), then in S35 the CPU 11 reads the output value $Out_y$ corresponding to the luminance signal Y from the median value table 12d and advances to S29.

Further, if the CPU 11 determines in S32 that the normalized reflectance value refle(x, y) does not exceed 0.3 (S32: NO), indicating that the normalized reflectance value refle is 0.3, then in S36 the CPU 11 reads the output value $Out_y$ corresponding to the luminance signal Y from the lower limit table 12e and advances to S29.

Since the normalized reflectance values refle used for generating the output values $Out_y$ stored in the tables 12c-12e are 1.3, 0.8, and 0.3, respectively, linear interpolation need not be performed when the normalized reflectance value refle is 1.3, 0.8, or 0.3. The processes of S30, S35, and S36 are performed when the normalized reflectance value refle calculated for a pixel is 1.3, 0.8, and 0.3, respectively. After these steps, the CPU 11 advances directly to S29, skipping the linear interpolation operation performed in S28 and S34. Hence, when advancing directly to S29 from S30, S35, or S36, the CPU 11 converts the output value $Out_y$ read from the tables 12c-12e directly to the output value Out.

As described above, the printer 1 is provided with the tables 12c-12e for storing output values Duty generated according to equation (4), which includes a gamma correction operation, in association with luminance signals Y less than 128 and for storing output values $Out_y$ generated based on a linear function, which is a monotonically increasing function, for luminance signals Y greater than or equal to 128. The printer 1 extracts output values $Out_y$ from the tables 12c-12e based on the luminance signal Y and the normalized reflectance value refle of the target pixel and produces an output value Out by converting the extracted output value $Out_y$ to RGB values. Here, the output value $Out_y$ corresponding to a luminance signal Y of 255 in the original image is set to 240 in the lower limit table 12e, which value is slightly larger than the value found through gamma correction. On the other hand, the output value $Out_y$ corresponding to the luminance signal Y of 255 in the original image is set to 255 in the upper limit table 12c. Accordingly, the distribution range of possible output values $Out_y$ in bright regions (regions with larger luminance signals Y) can be suppressed to a smaller range than in the convention method of performing gamma correction, thereby greatly suppressing over-correction in such bright regions. Therefore, the printer 1 can both increase luminance in dark regions of an original image (regions with smaller luminance signals Y; less than 128 in the embodiment), i.e., perform backlighting correction, and suppress over-correction in bright regions. Additionally, the printer 1 can accentuate contrast in intermediate regions where such backlighting correction and suppression of over-correction are unnecessary.

Further, by referencing table data when performing the Retinex process on an inputted original image, it is possible to generate the output image without performing gamma correction, thereby achieving high-speed image processing. Since the printer 1 is also provided with table data formed with the normalized reflectance value refle most often found in an original image (the median value table 12d), the printer 1 can create accurate output values Out by referencing the table data and can maintain image quality despite generating the output image without performing gamma correction.

Next, a second embodiment of the invention will be described with reference to FIG. 11. The printer 1 according to the first embodiment described above includes the upper limit table 12c, median value table 12d, and lower limit table 12e and is configured to generate output values Out for an inputted original image by extracting output values $Out_y$ from the tables 12c-12e based on the luminance signal Y and the normalized reflectance value refle of each pixel. Hence, the image-processing program 12a of the printer 1 is configured for generating output values $Out_y$ from prestored table data.

However, in the second embodiment, the image-processing program 12a is configured for generating output values $Out_y$ from the luminance signal Y and normalized reflectance value refle of each pixel in the original image by performing gamma correction or operations according to a linear function. Therefore, the tables 12c-12e of the first embodiment are not provided in the second embodiment. In the following description, like parts and components with those in the first embodiment described above are designated with the same reference numerals to avoid duplicating description.

The image-processing program 12a according to the second embodiment implements the same correction process described in FIG. 9. However, the output value calculating process of S15 executed during the correction process of FIG. 9 is modified to the output value calculating process of S51 shown in FIG. 11.

Figure 11:
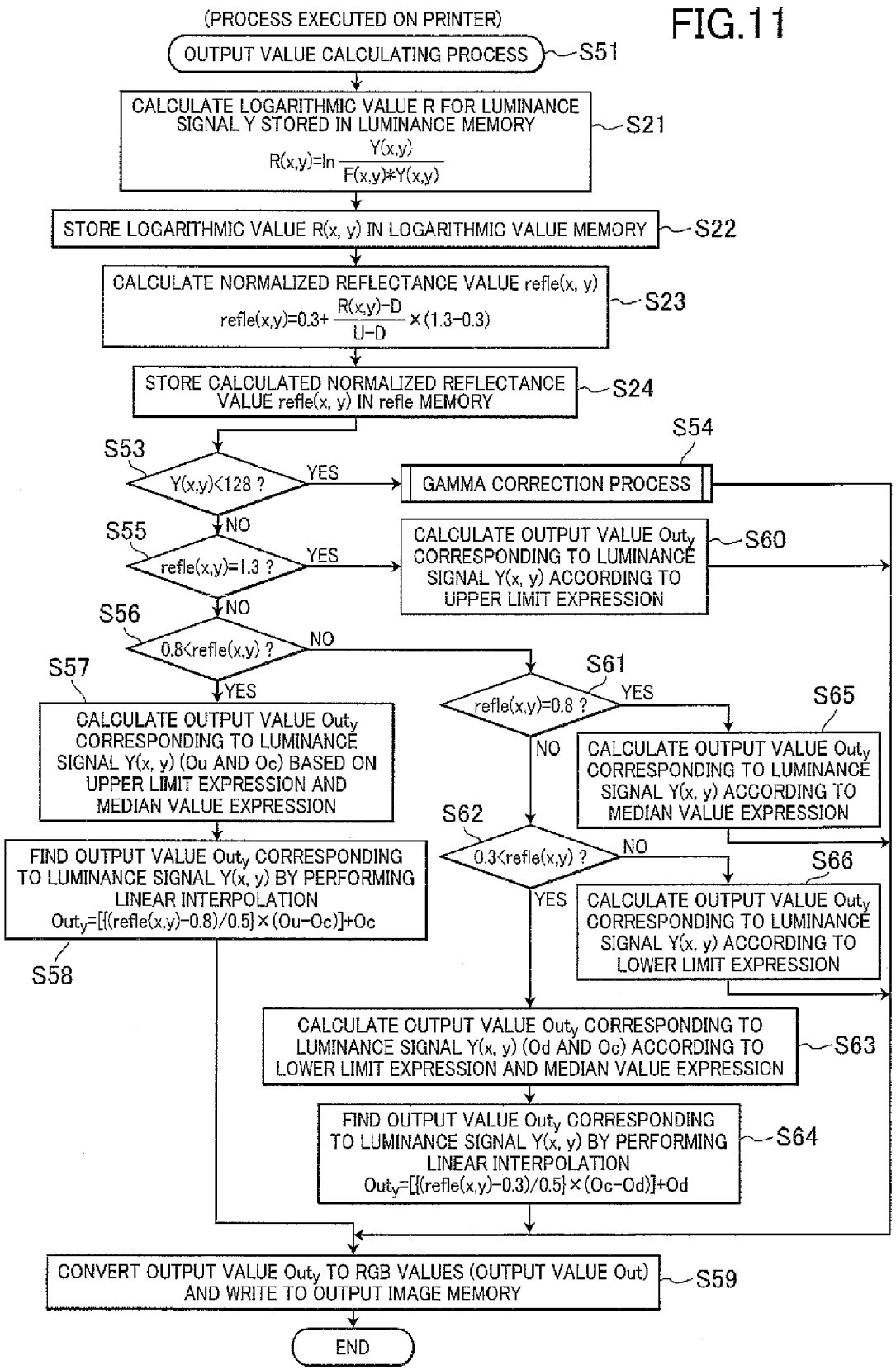
FIG. 11 is a flowchart illustrating steps in an output value calculating process executed during a correction process according to a second embodiment.

FIG. 11 is a flowchart illustrating steps in the output value calculating process of S51 according to the second embodiment executed during the correction process of FIG. 9. The output value calculating process of S51 is executed for each target pixel (each luminance signal Y). Specifically, the printer 1 repeatedly reads a luminance signal Y from the luminance memory 13f each time the output value calculating process is executed in an order conforming to the coordinates (the raster scanning order from the initial coordinates to the final coordinates) until the process has been performed on the luminance signal Y of the final pixel.

In the output value calculating process of S51 the printer 1 performs the same processes in S21-S24 as in the output value calculating process of S15 according to the first embodiment. Specifically, the printer 1 calculates a reflectance value (logarithmic value R) for the luminance signal Y stored in the luminance memory 13f, stores the logarithmic value R in the logarithmic value memory 13g, calculates the normalized reflectance value refle(x, y), and stores the normalized reflectance value refle(x, y) in the refle memory 13h.

In S53 the CPU 11 determines whether the luminance signal Y(x, y) is less than 128. If the luminance signal Y(x, y) is not less than 128 (S53: NO), then the printer 1 performs a process beginning from S55 to calculate the output value $Out_y$ according to a linear function. Specifically, in S55 the printer 1 determines whether the normalized reflectance value refle (x, y) stored in the refle memory 13h is 1.3. If the normalized reflectance value refle(x, y) is not 1.3 (S55: NO), indicating that the normalized reflectance value refle is less than 1.3, then in S56 the printer 1 determines whether the normalized reflectance value refle(x, y) exceeds 0.8. Through the process of s56, the printer 1 determines whether the normalized reflectance value refle is within a range greater than 0.8 and less than 1.3. If the normalized reflectance value refle(x, y) exceeds 0.8 (S56:YES), then in S57 the CPU 11 calculates the output value $Out_y$ corresponding to the luminance signal Y(x, y) read from the luminance memory 13f according to both the upper limit expression and the median value expression, setting Ou to the output value $Out_y$ calculated according to the upper limit expression and Oc to the output value $Out_y$ calculated according to the median value expression.

Each of these expressions is the same expression used in the first embodiment. Specifically, the upper limit expression is the linear function (y=0.62x+97.14). The median value expression is the linear function (y=0.77x+51.13). A lower limit expression is also a linear function (y=1.04x−25.33).

In S58 the CPU 11 performs linear interpolation on the calculated output values Ou and Oc according to equation (7)

based on the normalized reflectance value refle(x, y) to find the output value $Out_y$ corresponding to the luminance signal Y(x, y).

In S59 the CPU 11 converts the output value $Out_y$ back to RGB values according to equation (6) to generate an output value Out and writes the output value Out to the output image memory 13$i$ in association with the coordinates (x, y) of the source luminance signal Y. Subsequently, the CPU 11 ends the output value calculating process of S51.

If the printer 1 determines in S53 that the luminance signal Y(x, y) is less than 128 (S53: YES), then in S54 the CPU 11 executes a gamma correction operation to calculate the output value $Out_y$ according to equation (4), which includes gamma correction, based on the luminance signal Y and the normalized reflectance value refle. Subsequently, the CPU 11 advances to S59.

Further, if the CPU 11 determines in S55 that the normalized reflectance value refle(x, y) is 1.3 (S55: YES), then in S60 the CPU 11 calculates the output value $Out_y$ corresponding to the luminance signal Y(x, y) according to the upper limit expression, and subsequently advances to S59.

Further, if the CPU 11 determines in S56 that the normalized reflectance value refle(x, y) does not exceed 0.8 (S56, NO), then in S61 the CPU 11 determines whether the normalized reflectance value refle is 0.8. If the normalized reflectance value refle is not 0.6 (S61: NO), indicating that the normalized reflectance value refle is less than 0.8, then in S62 the CPU 11 determines whether the normalized reflectance value refle exceeds 0.3. Through the process of S62 the CPU 11 determines whether the normalized reflectance value refle falls within a range greater than 0.3 and less than 0.8. If the normalized reflectance value refle(x, y) exceeds 0.3 (S62: YES), then in S63 the CPU 11 calculates the output value $Out_y$ corresponding to the luminance signal Y(x, y) read from the luminance memory 13$f$ according to the lower limit expression and the median value expression, setting Od to the output value $Out_y$ calculated according to the lower limit expression and setting Oc to the output value $Out_y$ calculated according to the median value expression. In S64 the CPU 11 performs linear interpolation on the calculated output values Oc and Od according to equation (8) based on the normalized reflectance value refle(x, y) to find the output value $Out_y$ corresponding to the luminance signal Y(x, y). Subsequently, the CPU 11 advances to S59.

If the CPU 11 determines in S61 that the normalized reflectance value refle is 0.8 (S61 YES), then in S65 the CPU 11 calculates the output value $Out_y$ corresponding to the luminance signal Y according to the median value expression, and subsequently advances to S59.

Further, if the CPU 11 determines in S62 that the normalized reflectance value refle(x, y) does not exceed 0.3 (S62: No), indicating that the normalized reflectance value refle is 0.3, then in S66 the CPU 11 calculates the output value $Out_y$ corresponding to the luminance signal Y according to the lower limit expression, and subsequently advances to S59.

Since each of the above expressions corresponds to cases in which the normalized reflectance value refle is 1.3, 0.8, and 0.3, respectively, linear interpolation is not necessary when the calculated normalized reflectance value refle is 1.3, 0.8, and 0.3. Since the processes in S60, S65, and S66 are executed when the calculated normalized reflectance value refle of each pixel is 1.3, 0.8, and 0.3, respectively, the CPU 11 advances directly to S59 after executing these processes without performing the linear interpolation in S58 or S64. Hence, when executing the process in S59 after performing the process in S60, S65, or S66, the CPU 11 converts the output value $Out_y$ calculated according to the above expressions directly to the output value Out.

According to the second embodiment described above, the printer 1 determines whether the luminance signal Y is less than 128, generates the output value $Out_y$ according to gamma correction when the luminance signal Y is less than 128, and generates the output value $Out_y$ according to a linear function (upper limit expression, median value expression, or lower limit expression) when the luminance signal Y is greater than or equal to 128. Hence, through a combination of calculations using gamma correction and linear functions, the CPU 11 can correct color gradation while suppressing over-correction, even when the printer 1 is not provided with the tables 12$c$-12$e$ pre-storing output values $Out_y$.

Next, a third embodiment of the invention will be described with reference to FIGS. 12A through 13. In the first embodiment described above, the tables 12$c$-12$e$ are configured to store output values $Out_y$ generated for each luminance signal Y based on gamma correction when the luminance signal Y is less than 128, and output values $Out_y$ for each luminance signal Y generated based on linear functions for luminance signals Y greater than or equal to 128. However, the tables 12$c$-12$e$ according to the third embodiment are configured to store output values $Out_y$ generated for the luminance signals Y based on a cubic function. In the following description, like parts and components to those in the first embodiment are designated with the same reference numerals to avoid duplicating description.

Figure 13:
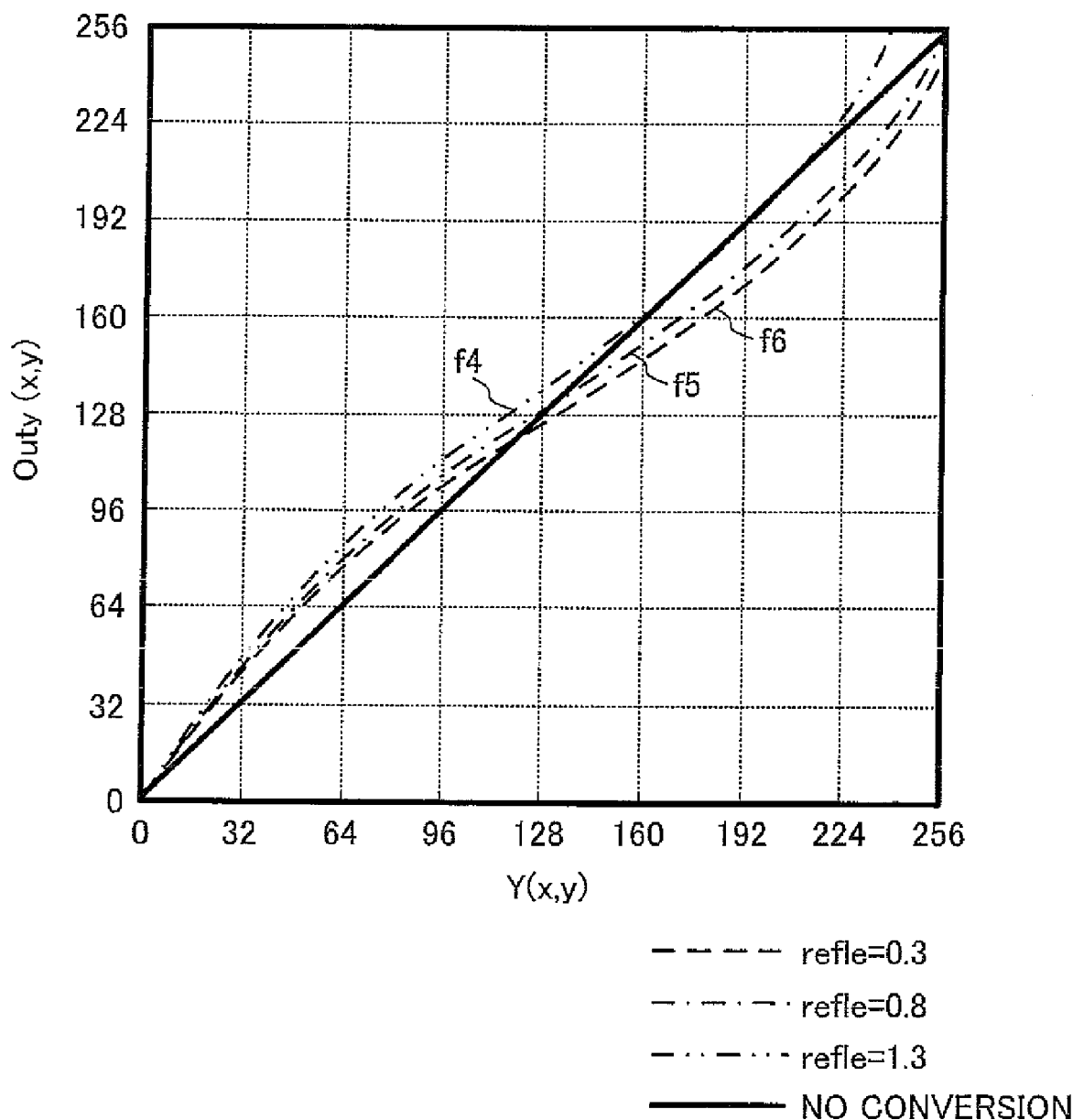
FIG. 13 is a graph illustrating the relationship between luminance signals and output values stored in the table according to the third embodiment shown in FIGS. 12A through 12C.

Other than using the tables 12$c$-12$e$ shown in FIGS. 12A through 13 in place of the tables 12$c$-12$e$ described in the first embodiment, the printer 1 according to the third embodiment executes an image process according to the same image-processing program 12$a$ described in the first embodiment.

FIGS. 12A through 12C conceptually illustrate the structure of the tables 12$c$-12$e$ stored in the ROM 12 according to the third embodiment. In FIGS. 12A through 12C, the upper limit table 12$c$, median value table 12$d$, and lower limit table 12$e$ are arranged in a list format displaying output values $Out_y$ derived for each luminance signal Y between 0 and 255 according to a cubic function. Specifically, FIG. 12A shows the tables for luminance signals from 1 to 85, FIG. 12B shows the tables for luminance signals from 86 to 170, and FIG. 12C shows the tables for luminance signals from 171 to 255. The output values $Out_y$ are displayed in three columns to the right of the luminance signals Y listed in order from 0 to 255. In order from left to right, the three columns of output values $Out_y$ indicate table data stored in the lower limit table 12$e$, median value table 12$d$, and upper limit table 12$c$, respectively. In other words, the columns in order from left to right indicate output values $Out_y$ generated when the normalized reflectance value refle is 0.3, output values $Out_y$ generated when the normalized reflectance value refle is 0.8, and output values $Out_y$ generated when the normalized reflectance value refle is 1.3. The output values $Out_y$ stored in the tables 12$c$-12$e$ are derived from equation (9) below.

$$Out y = K \times \{(Y/255) \times (Y/255) \times (Y/255) - 1.5 \times (Y/255) \times (Y/255) + 1.5 \times (Y/255)\} \quad \text{Equation (9)}$$

K in equation (9) is a coefficient and the value of the output value $Out_y$ derived when the luminance signal Y is 255. In the third embodiment, K is set to 240 when the normalized reflectance value refle is 0.3, 255 when the normalized reflectance value refle is 0.8, and 272 when the normalized reflectance value refle is 1.3. In other words, the lower limit table 12$e$ stores output values $Out_y$ calculated according to equation (9) when the coefficient K is 240; the median value table 12$d$ stores output values $Out_y$ calculated according to equation (9) when the coefficient K is 255; and the upper limit table 12c stores output values $Out_y$ calculated according to equation (9) when the coefficient K is 272.

Note that, in FIG. 12C, output values $Out_y$ for luminance signals from 244 to 255 are greater than 255 when the normalized reflectance value refle is 1.3. However, these values are rounded down to 255 when the output values $Out_y$ are actually outputted. In other words, the output values are processed so that generated pixel values greater than 255 are converged to 255.

FIG. 13 is a graph showing the relationship between the luminance signals Y and output values $Out_y$ (a function for finding output values $Out_y$ from luminance signals Y), which is the table data stored in the tables 12c-12e according to the third embodiment shown in FIGS. 12A through 12C. Specifically, the graph shows curves of cubic functions generated according to equation (9) when the coefficient K is 240, 255, and 272, where the horizontal axis represents the luminance signal Y and the vertical axis the output value $Out_y$.

Since pixels having a luminance signal Y of 255 are converted to an output value $Out_y$ of 255 when the normalized reflectance value refle is 0.8, the brightest pixels (white pixels) in the output image can be generated from the brightest pixels in the original image. Since target pixels have the same brightness as their peripheral pixels in most regions of the original image, the normalized reflectance value refle is 0.8 in these regions. Accordingly, the output value $Out_y$ is set to 255 for most of the brightest pixels (pixels having a luminance signal Y of 255) in the original image, enabling the printer 1 to maintain the luminance of these pixels in the output image to avoid generating an overall dark image.

The characteristic line f4 (a cubic function curve) indicated by a double-dot chain line in FIG. 13 is a function for generating the output values $Out_y$ stored in the upper limit table 12c from the luminance signal Y and, therefore, graphs the table data in the upper limit table 12c. Similarly, the characteristic line f5 (a cubic function curve) indicated by a single-dot chain line is a function for generating the output values $Out_y$ stored in the median value table 12d from the luminance signal Y and, therefore, graphs the table data in the median value table 12d. The characteristic line f6 (a cubic function curve) indicated by a dashed line is a function for generating the output values $Out_y$ stored in the lower limit table 12e from the luminance signal Y and, therefore, graphs the table data in the lower limit table 12e.

Values obtained from these characteristic lines f4-f6 are output values $Out_y$ generated for each integer value of luminance signal Y between 0 and 255. Hence, the output values $Out_y$ obtained from these characteristic lines are stored in the corresponding tables 12c-12e shown in FIGS. 12A through 12C in association with each luminance signal Y value between 0 and 255.

The output values $Out_y$ stored in the tables 12c-12e in the third embodiment are generated according to the cubic function curves shown in FIG. 13. Therefore, the output values $Out_y$ do not have a switching point and change gently in response to changes in the luminance signal Y, without any abrupt changes. The output values $Out_y$ on the characteristic lines f4-f6 are greater than the values obtained from the non-conversion line (y=x) in a range between 0 and a predetermined luminance signal Y (on the side of smaller luminance signals Y), thereby achieving a gamma correction in a broad sense.

Since the output values $Out_y$ are produced by increasing the inputted luminance signals Y in regions of smaller luminance signals Y, the printer 1 can perform backlighting correction (increase luminance). Further, each of the characteristic lines f4-f6 has an inflection point at the luminance signal Y of 128. As the luminance signals Y increase after the inflection point, the output values $Out_y$ rise smoothly toward the final value (maximum value) according to a monotonically increasing function. Accordingly, the printer 1 can sufficiently suppress over-correction in bright regions.

By using a cubic function in the third embodiment, the printer 1 not only can correct backlighting in required areas (where the luminance signal is small), but also can accentuate contrast and suppress over-correction in bright regions. In addition, since the cubic function curve changes without a switching point, the printer 1 can change the output values $Out_y$ gently in response to changes in the luminance signals Y. Hence, when generating output values $Out_y$ according to the cubic function, the printer 1 can avoid abrupt changes in output values $Out_y$ relative to the amount of change in the luminance signals Y, preventing unnatural gradation changes throughout the overall image.

While the invention has been described in detail with reference to the above aspects thereof, it would be apparent to those skilled in the art that various changes and modifications may be made therein without departing from the scope of the claims.

In the above-described embodiment, the RGB color system is used, but a color system other than the RGB color system may be used. For example, the invention may be applied to the CMY color model or the like.

According to the image-processing program 12a of the embodiments described above, the printer 1 calculates the normalized reflectance value refle and selects a table to be referenced based on the normalized reflectance value refle. The tables 12c-12e are formed using the normalized reflectance value refle as a parameter. However, the tables 12c-12e may also be formed using the logarithmic value R as a parameter, and the printer 1 may select a table based on the logarithmic value R.

In the above-described embodiments, the CPU 11 provided in the printer 1 executes the image processing program. However, this program may be provided to a personal computer as an application program that is executed by a CPU or the like provided in the personal computer. Further, the program may be executed by a multifunction peripheral having a plurality of functions including printer, scanner, copier, facsimile, and the like.

Either the single-scale Retinex (SSR) or multi-scale Retinex (MSR) method may be used in the Retinex process.

In the above-described embodiments, the CPU 11 in the printer 1 performs the Retinex process and the like. However, these processes may be performed with a digital signal processor (DSP). The DSP can be used to execute product-sum operations and other operations more quickly.

In the embodiments described above, the printer 1 is configured to temporarily store the calculated luminance signal and chromatic signals in the luminance memory 13f of the RAM 13. However, if it is desirable to reduce the quantity of data being stored, the printer 1 may read the pixel values (RGB values) from the original image memory as needed and calculate the luminance signal each time without storing the same.

Further, while the printer 1 finds a normalization range (clipped range) for normalizing the logarithmic values R (reflectance values) based on a median value in the histogram in the embodiments described above, the printer 1 may find this clipped range using a mode value or average value instead. Further, the concept of a target pixel having the same brightness as its peripheral pixels based on the reflected light components is not restricted to the target pixel having the exact same signal value as the average luminance value of its peripheral pixels, but may include cases in which the logarithmic value R is 0 after truncating, rounding up, or rounding up or down to the nearest. Further, while the logarithmic value R is 0 when the signal value of the target pixel is the same as the average luminance value of its peripheral pixels, the median value, mode value, or average value of the logarithmic value R in a generated histogram is not always 0 and be deviate therefrom. Hence, a range covering this deviation may be set as the region in which the signal value of the target pixel is considered to be the same as the average luminance value of its peripheral pixels (the region in which the logarithmic value R is considered to be 0; i.e., the region in which the target pixel is considered to have the same brightness as its peripheral pixels).

When the normalized reflectance value refle is 0.3 in the first through third embodiments described above, the printer 1 is configured to set the output value $Out_y$ to 240 for an inputted luminance signal Y of 255. However, the output value $Out_y$ corresponding to a luminance signal Y of 255 need not be limited to 240, but may be a value approaching 255, which is the brightest luminance signal that can be outputted. For example, the corresponding output value $Out_y$ may be set to an arbitrary value between 224 and 255.

When the normalized reflectance value refle is 0.8 in the first and third embodiments described above, the printer 1 is configured to set the output value $Out_y$ to 248 and 255, respectively, when the inputted luminance signal Y is 255. However, the printer 1 may be configured to set the output value $Out_y$ to a value approaching 255, which is the brightest luminance signal that can be outputted, such as an arbitrary value between 240 and 255.

Similarly, when the normalized reflectance value refle is 1.3 in the first and third embodiments described above, the printer 1 is configured to set the output value $Out_y$ to 255 and 272, respectively, when the inputted luminance signal Y is 255. However, the printer 1 may set the output value $Out_y$ to a value approaching 255, the brightest luminance signal that can be outputted, such as an arbitrary value between 255 and 280.

While the printer 1 is configured to perform the Retinex process on the luminance signals Y in the embodiments described above, the printer 1 may instead be configured to perform the Retinex process using the RGB values themselves.

In the above-described embodiment, the tables 12c-12e store output values $Out_y$ (second pixel values) in association with the luminance signals Y (first pixel values). Instead, the tables may store the value [Y(x,y)/(255×refle(x,y))] to the power of (1−1/γ) in equation (4) or (4') (gamma-corrected values obtained by performing gamma correction on the first pixel values using a predetermined reflectance component) in association with the luminance signals Y (first pixel values).

What is claimed is:

1. An image processing device comprising:
  a reflectance-component calculating portion that calculates a reflectance component based both on a pixel value of a subject pixel in an original image and on an average luminance of peripheral pixels around the subject pixel, the reflectance component being indicative of brightness of the subject pixel relative to the peripheral pixels; and
  a first pixel-value generating portion that generates a pixel value of an output image when the reflectance component indicates that the subject pixel is darker than the peripheral pixels, the first pixel-value generating portion comprising:
    a first lower-range generating portion that generates the pixel value of the output image based on a first nonlinear function in a first lower range where the pixel value of the subject pixel is lower than a first predetermine value; and
    a first upper-range generating portion that generates the pixel value of the output image based on a first monotonically increasing function in a first upper range where the pixel value of the subject pixel is greater than or equal to the first predetermine value, the pixel value of the output image increasing toward a first maximum output luminance value as the pixel value of the subject pixel increases, the first maximum output luminance value being greater than a luminance value obtained by correcting a maximum pixel value of the original image based on the first nonlinear function, the first maximum output luminance value being proximate to the maximum pixel value of the original image.

2. The image processing device according to claim 1, wherein both the pixel value of the original image and the pixel value of the output image have a range between 0 and 255; and
  wherein the first maximum output luminance value equals to 240.

3. The image processing device according to claim 1, wherein the first predetermined value is greater than or equal to a value corresponding to an intersecting point between a curve for the first nonlinear function of a minimum reflectance component and a curve for a non-conversion function, the non-conversion function generating the pixel value of the output image that is identical with the pixel value of the subject pixel.

4. The image processing device according to claim 3, wherein the first predetermined value is a value where a difference between a pixel value derived from a nonlinear function of a maximum reflectance component and a pixel value derived from a nonlinear function of a minimum reflectance component is smaller than or equal to a predetermined difference.

5. The image processing device according to claim 3, wherein the first predetermined value is a value proximate to a midpoint of a range that the pixel value of the subject pixel takes.

6. The image processing device according to claim 1, further comprising a second pixel-value generating portion that generates the pixel value of the output image when the reflectance component indicates that the subject pixel has a same brightness as the peripheral pixels, the second pixel-value generating portion comprising:
  a second lower-range generating portion that generates the pixel value of the output image based on a second nonlinear function in a second lower range where the pixel value of the subject pixel is lower than a second predetermine value; and
  a second upper-range generating portion that generates the pixel value of the output image based on a second monotonically increasing function in a second upper range where the pixel value of the subject pixel is greater than or equal to the second predetermine value, the pixel value of the output image increasing toward a second maximum output luminance value as the pixel value of the subject pixel increases, the second maximum output luminance value being greater than a luminance value obtained by correcting a maximum pixel value of the original image based on the second nonlinear function, the second maximum output luminance value being proximate to the maximum pixel value of the original image.

7. The image processing device according to claim 6, wherein the second predetermined value is greater than or equal to a value corresponding to an intersecting point between a curve for the first nonlinear function of a minimum reflectance component and a curve for a non-conversion function, the non-conversion function generating the pixel value of the output image that is identical with the pixel value of the subject pixel.

8. The image processing device according to claim 7, wherein the second predetermined value is set in such a manner that a pixel value derived from the second nonlinear function or the second monotonically increasing function is greater than a pixel value derived from the first nonlinear function or the first monotonically increasing function for the same subject pixel.

9. The image processing device according to claim 1, further comprising a third pixel-value generating portion that generates the pixel value of the output image when the reflectance component indicates that the subject pixel is brighter than the peripheral pixels, the third pixel-value generating portion comprising:
 a third lower-range generating portion that generates the pixel value of the output image based on a third nonlinear function in a third lower range where the pixel value of the subject pixel is lower than a third predetermine value; and
 a third upper-range generating portion that generates the pixel value of the output image based on a third monotonically increasing function in a third upper range where the pixel value of the subject pixel is greater than or equal to the third predetermine value, the pixel value of the output image increasing toward a third maximum output luminance value as the pixel value of the subject pixel increases, the third maximum output luminance value being greater than a luminance value obtained by correcting a maximum pixel value of the original image based on the third nonlinear function, the third maximum output luminance value being proximate to the maximum pixel value of the original image.

10. The image processing device according to claim 9, wherein both the pixel value of the original image and the pixel value of the output image have a range between 0 and 255; and
 wherein the third maximum output luminance value equals to 255.

11. The image processing device according to claim 9, wherein the third predetermined value is greater than or equal to a value corresponding to an intersecting point between a curve for the first nonlinear function of a minimum reflectance component and a curve for a non-conversion function, the non-conversion function generating the pixel value of the output image that is identical with the pixel value of the subject pixel.

12. The image processing device according to claim 11, further comprising a second pixel-value generating portion that generates the pixel value of the output image when the reflectance component indicates that the subject pixel has a same brightness as the peripheral pixels, the second pixel-value generating portion comprising:
 a second lower-range generating portion that generates the pixel value of the output image based on a second nonlinear function in a second lower range where the pixel value of the subject pixel is lower than a second predetermine value; and
 a second upper-range generating portion that generates the pixel value of the output image based on a second monotonically increasing function in a second upper range where the pixel value of the subject pixel is greater than or equal to the second predetermine value, the pixel value of the output image increasing toward a second maximum output luminance value as the pixel value of the subject pixel increases, the second maximum output luminance value being greater than a luminance value obtained by correcting a maximum pixel value of the original image based on the second nonlinear function, the second maximum output luminance value being proximate to the maximum pixel value of the original image,
 wherein the third predetermined value is set in such a manner that a pixel value derived from the third nonlinear function or the third monotonically increasing function is greater than a pixel value derived from the first nonlinear function or the first monotonically increasing function for the same subject pixel, and that the pixel value derived from the third nonlinear function or the third monotonically increasing function is greater than a pixel value derived from the second nonlinear function or the second monotonically increasing function for the same subject pixel.

13. The image processing device according to claim 1, further comprising a storage portion that stores, in association with first pixel values, table values including either gamma-corrected values obtained by performing gamma correction on the first pixel values using at least one predetermined reflectance component or second pixel values calculated based on both the gamma-corrected values and the first pixel values,
 wherein the first pixel-value generating portion comprises:
 an extracting portion that extracts at least one of the table values corresponding to the pixel value of the subject pixel; and
 a determining portion that determines the pixel value of the output image based on the at least one of the table values extracted by the extracting portion.

14. The image processing device according to claim 1, wherein a single function is used for implementing both the first nonlinear function and the first monotonically increasing function.

15. A non-transitory computer readable storage medium storing a set of program instructions executable on an image processing device, the set of program instructions comprising:
 (a) calculating a reflectance component based both on a pixel value of a subject pixel in an original image and on an average luminance of peripheral pixels around the subject pixel, the reflectance component being indicative of brightness of the subject pixel relative to the peripheral pixels; and
 (b) generating a pixel value of an output image when the reflectance component indicates that the subject pixel is darker than the peripheral pixels, the instructions (b) comprising:

(c) generating the pixel value of the output image based on a first nonlinear function in a first lower range where the pixel value of the subject pixel is lower than a first predetermine value; and (d) generating the pixel value of the output image based on a first monotonically increasing function in a first upper range where the pixel value of the subject pixel is greater than or equal to the first predetermine value, the pixel value of the output image increasing toward a first maximum output luminance value as the pixel value of the subject pixel increases, the first maximum output luminance value being greater than a luminance value obtained by correcting a maximum pixel value of the original image based on the first nonlinear function, the first maximum output luminance value being proximate to the maximum pixel value of the original image.

16. The storage medium according to claim 15, wherein both the pixel value of the original image and the pixel value of the output image have a range between 0 and 255; and
wherein the first maximum output luminance value equals to 240.

17. The storage medium according to claim 15, wherein the first predetermined value is greater than or equal to a value corresponding to an intersecting point between a curve for the first nonlinear function of a minimum reflectance component and a curve for a non-conversion function, the non-conversion function generating the pixel value of the output image that is identical with the pixel value of the subject pixel.

18. The storage medium according to claim 15, wherein the set of program instructions further comprises:

(e) generating the pixel value of the output image when the reflectance component indicates that the subject pixel has a same brightness as the peripheral pixels, the instructions (e) comprising:

(f) generating the pixel value of the output image based on a second nonlinear function in a second lower range where the pixel value of the subject pixel is lower than a second predetermine value; and (g) generating the pixel value of the output image based on a second monotonically increasing function in a second upper range where the pixel value of the subject pixel is greater than or equal to the second predetermine value, the pixel value of the output image increasing toward a second maximum output luminance value as the pixel value of the subject pixel increases, the second maximum output luminance value being greater than a luminance value obtained by correcting a maximum pixel value of the original image based on the second nonlinear function, the second maximum output luminance value being proximate to the maximum pixel value of the original image.

19. The storage medium according to claim 18, wherein the second predetermined value is greater than or equal to a value corresponding to an intersecting point between a curve for the first nonlinear function of a minimum reflectance component and a curve for a non-conversion function, the non-conversion function generating the pixel value of the output image that is identical with the pixel value of the subject pixel.

20. The storage medium according to claim 19, wherein the second predetermined value is set in such a manner that a pixel value derived from the second nonlinear function or the second monotonically increasing function is greater than a pixel value derived from the first nonlinear function or the first monotonically increasing function for the same subject pixel.

21. The storage medium according to claim 15, wherein the set of program instructions further comprises:

(h) generating the pixel value of the output image when the reflectance component indicates that the subject pixel is brighter than the peripheral pixels, the instructions (h) comprising:

(i) generating the pixel value of the output image based on a third nonlinear function in a third lower range where the pixel value of the subject pixel is lower than a third predetermine value; and (j) generating the pixel value of the output image based on a third monotonically increasing function in a third upper range where the pixel value of the subject pixel is greater than or equal to the third predetermine value, the pixel value of the output image increasing toward a third maximum output luminance value as the pixel value of the subject pixel increases, the third maximum output luminance value being greater than a luminance value obtained by correcting a maximum pixel value of the original image based on the third nonlinear function, the third maximum output luminance value being proximate to the maximum pixel value of the original image.

22. The storage medium according to claim 21, wherein both the pixel value of the original image and the pixel value of the output image have a range between 0 and 255; and
wherein the third maximum output luminance value equals to 255.

23. The storage medium according to claim 21, wherein the third predetermined value is greater than or equal to a value corresponding to an intersecting point between a curve for the first nonlinear function of a minimum reflectance component and a curve for a non-conversion function, the non-conversion function generating the pixel value of the output image that is identical with the pixel value of the subject pixel.

24. The storage medium according to claim 23, wherein the set of program instructions further comprises:

(k) generating the pixel value of the output image when the reflectance component indicates that the subject pixel has a same brightness as the peripheral pixels, the instructions (k) comprising:

(l) generating the pixel value of the output image based on a second nonlinear function in a second lower range where the pixel value of the subject pixel is lower than a second predetermine value; and (m) generating the pixel value of the output image based on a second monotonically increasing function in a second upper range where the pixel value of the subject pixel is greater than or equal to the second predetermine value, the pixel value of the output image increasing toward a second maximum output luminance value as the pixel value of the subject pixel increases, the second maximum output luminance value being greater than a luminance value obtained by correcting a maximum pixel value of the original image based on the second nonlinear function, the second maximum output luminance value being proximate to the maximum pixel value of the original image, wherein the third predetermined value is set in such a manner that a pixel value derived from the third nonlinear function or the third monotonically increasing function is greater than a pixel value derived from the first nonlinear function or the first monotonically increasing function for the same subject pixel, and that the pixel value derived from the third nonlinear function or the third monotonically increasing function is greater than a pixel value derived from the second nonlinear function or the second monotonically increasing function for the same subject pixel.

25. The storage medium according to claim 15, wherein the instructions (b) further comprise:

(n) extracting at least one of table values corresponding to the pixel value of the subject pixel, the table values being stored in association with first pixel values in a storage portion, the table values including either gamma-corrected values obtained by performing gamma correction on the first pixel values using at least one predetermined reflectance component or second pixel values calculated based on both the gamma-corrected values and the first pixel values; and (o) determining the pixel value of the output image based on the at least one of the table values extracted by the instructions (n).

* * * * *